US009723104B1

(12) United States Patent
Pappu et al.

(10) Patent No.: US 9,723,104 B1
(45) Date of Patent: *Aug. 1, 2017

(54) MONITORING THE PERFORMANCE OF A CONTENT PLAYER

(71) Applicant: Conviva Inc., Foster City, CA (US)

(72) Inventors: Prashanth Pappu, San Francisco, CA (US); Asad K. Awan, San Francisco, CA (US); Aditya Ravikumar Ganjam, San Francisco, CA (US); Ryan J. Huebsch, San Francisco, CA (US)

(73) Assignee: Conviva Inc., Foster City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/921,928

(22) Filed: Oct. 23, 2015

Related U.S. Application Data

(63) Continuation of application No. 12/780,799, filed on May 14, 2010, now Pat. No. 9,203,913.

(60) Provisional application No. 61/227,066, filed on Jul. 20, 2009, provisional application No. 61/339,925, filed on Mar. 10, 2010.

(51) Int. Cl.
*G06F 15/16* (2006.01)
*H04L 29/08* (2006.01)
*H04N 21/2662* (2011.01)
*H04L 29/06* (2006.01)

(52) U.S. Cl.
CPC ............ *H04L 67/32* (2013.01); *H04L 65/601* (2013.01); *H04L 67/22* (2013.01)

(58) Field of Classification Search
CPC ......... H04N 21/25808; H04N 21/2662; H04N 21/643; H04N 21/64769; H04N 21/84; H04N 21/845; H04N 21/64792; H04L 65/60; H04L 47/25
See application file for complete search history.

(56) References Cited

U.S. PATENT DOCUMENTS

| 5,926,204 | A | 7/1999 | Mayer |
| 5,930,473 | A | 7/1999 | Teng et al. |
| 6,279,039 | B1 | 8/2001 | Bhat |
| 6,438,592 | B1 | 8/2002 | Killian |
| 6,836,691 | B1 | 12/2004 | Stirton |
| 6,892,236 | B1 | 5/2005 | Conrad |
| 6,906,743 | B1 | 6/2005 | Maurer |
| 7,006,666 | B2 | 2/2006 | Montgomery |
| 7,356,341 | B2 | 4/2008 | Nanda |
| 7,490,136 | B2 * | 2/2009 | Suzuki .................... G06F 21/10 705/51 |
| 7,599,698 | B2 | 10/2009 | Cheng |

(Continued)

OTHER PUBLICATIONS

"Relay Nodes in Wireless Sensor Networks: A Survey"—Ataul Bari, University of Windsor, Nov. 2005, http://richard.myweb.cs.uwindsor.ca/cs510/survey_bari.pdf.

*Primary Examiner* — Abdullahi E Salad
(74) *Attorney, Agent, or Firm* — Van Pelt, Yi & James LLP

(57) ABSTRACT

Improving a content player engagement is described. An engagement of a first content player with respect to a content item being downloaded by the first client is measured. Performance information associated with the first content player is obtained. A quantitative relationship between the engagement and the performance information is determined. How a second client obtains the same content is adjusted based at least in part on the determined quantitative relationship.

29 Claims, 15 Drawing Sheets

(56) References Cited

U.S. PATENT DOCUMENTS

| | | | |
|---|---|---|---|
| 7,668,914 B2 | 2/2010 | Parker et al. | |
| 7,904,580 B2 * | 3/2011 | Mandera | H04L 12/2697 709/219 |
| 7,941,823 B2 | 5/2011 | Hasek | |
| 8,230,105 B2 * | 7/2012 | Melnyk | H04L 47/10 370/230 |
| 2002/0002708 A1 | 1/2002 | Arye | |
| 2002/0082730 A1 | 6/2002 | Capps et al. | |
| 2002/0095400 A1 | 7/2002 | Johnson | |
| 2002/0198984 A1 | 12/2002 | Goldstein et al. | |
| 2003/0046396 A1 | 3/2003 | Richter | |
| 2003/0046704 A1 | 3/2003 | Laksono et al. | |
| 2003/0061305 A1 | 3/2003 | Copley et al. | |
| 2004/0047354 A1 | 3/2004 | Slater | |
| 2004/0093155 A1 | 5/2004 | Simonds | |
| 2004/0107387 A1 | 6/2004 | Larsson et al. | |
| 2004/0133471 A1 * | 7/2004 | Pisaris-Henderson | G06Q 30/02 705/14.41 |
| 2004/0162901 A1 | 8/2004 | Mangipudi | |
| 2004/0236846 A1 | 11/2004 | Alvarez et al. | |
| 2005/0021715 A1 | 1/2005 | Dugatkin | |
| 2005/0060158 A1 * | 3/2005 | Endo | G10L 17/26 704/275 |
| 2005/0120131 A1 | 6/2005 | Allen | |
| 2005/0251835 A1 | 11/2005 | Scott et al. | |
| 2006/0135172 A1 | 6/2006 | Dronne | |
| 2006/0206539 A1 | 9/2006 | Thompson | |
| 2007/0101202 A1 | 5/2007 | Garbow | |
| 2007/0136311 A1 | 6/2007 | Kasten | |
| 2007/0140113 A1 | 6/2007 | Gemelos | |
| 2007/0286351 A1 | 12/2007 | Ethier et al. | |
| 2008/0049616 A1 | 2/2008 | Kamath et al. | |
| 2008/0049786 A1 | 2/2008 | Ram et al. | |
| 2008/0112315 A1 | 5/2008 | Hu et al. | |
| 2008/0151821 A1 | 6/2008 | Cho | |
| 2008/0155586 A1 | 6/2008 | Yang et al. | |
| 2009/0019503 A1 | 1/2009 | Vorbau | |
| 2009/0164656 A1 * | 6/2009 | Guan | H04N 21/4325 709/231 |
| 2009/0172200 A1 | 7/2009 | Morrison et al. | |
| 2009/0187956 A1 | 7/2009 | Sommer | |
| 2009/0328124 A1 | 12/2009 | Khouzam et al. | |
| 2010/0302002 A1 | 12/2010 | Guo | |
| 2012/0204068 A1 | 8/2012 | Ye et al. | |

\* cited by examiner

MONITORING THE PERFORMANCE OF A CONTENT PLAYER

CROSS REFERENCE TO OTHER APPLICATIONS

This application is a continuation of co-pending U.S. patent application Ser. No. 12/780,799, entitled MONITORING THE PERFORMANCE OF A CONTENT PLAYER filed May 14, 2010 which is incorporated herein by reference for all purposes, which claims priority to U.S. Provisional Patent Application No. 61/227,066 entitled REAL-TIME TELEMETRY FOR CONTENT filed Jul. 20, 2009 and to U.S. Provisional Patent Application No. 61/339,925 entitled TELEMETRY FOR CONTENT filed Mar. 10, 2010, both of which are incorporated herein by reference for all purposes.

BACKGROUND OF THE INVENTION

Users are increasingly using networks such as the Internet to access content, such as video files and live streaming/video on demand content, via client machines. Such content is often large, time sensitive, or both. As demand for such content increases, there are challenges in distributing that content efficiently and with high quality. As one example, it can be difficult to determine what impact modifications to the delivery of the content have on user experience.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
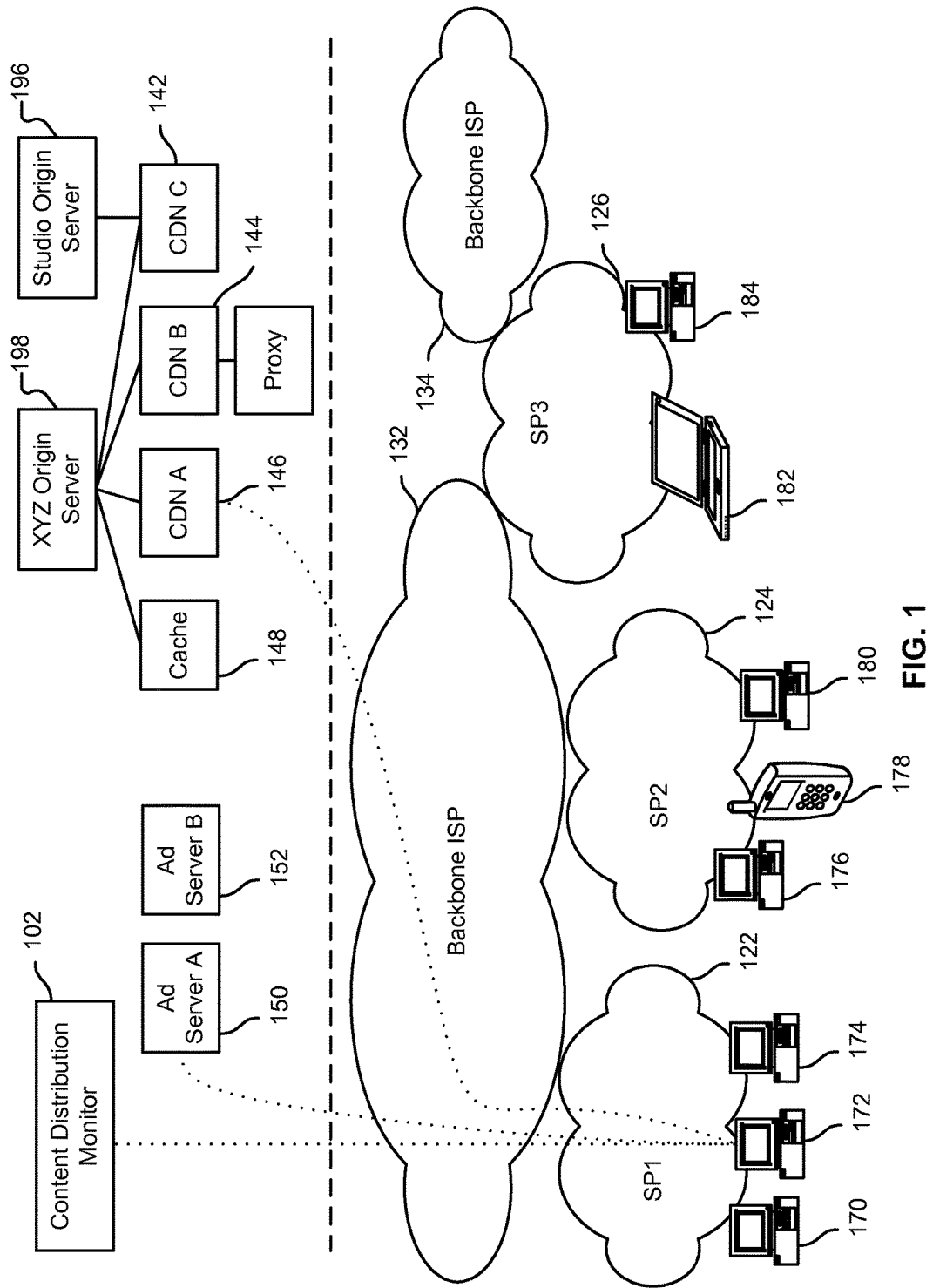
FIG. 1 is an illustration of an environment in which content is distributed.

FIG. 1 is an illustration of an environment in which content is distributed. In the example shown, clients 170-184 are used to access content, such as audiovisual content (e.g., movies, songs, television shows, sporting events, games, images, etc.) that is owned by content owners. The content is stored (or captured) at origin servers 196-198, then distributed via other servers, caches, content distribution networks (CDNs), proxies, etc. (collectively, "content sources"). Content sources employ a variety of technologies and include HTTP, Adobe Flash Media, and Microsoft Internet Information Service servers. In some embodiments content is also distributed by clients (e.g., using peer-to-peer techniques).

Examples of clients include personal computers (170), laptops (182), cellular phones/personal digital assistants (178), and other types of information appliances (not shown) such as set-top boxes, game consoles, broadband routers, file servers, video servers, and digital video recorders, as applicable. The clients shown are used by subscribers to various Internet service providers (ISPs). For example, clients 170, 172, and 174 are subscribed to SP1 (122), while clients 176, 178, and 180 are subscribed to SP2 (124), and clients 182 and 184 are subscribed to SP3 (126).

In the example shown, a movie studio ("Studio") has contracted with content distributor 142 to provide downloadable copies of its films in exchange for a fee. Similarly, a television network ("XYZ") has contracted with content distributors 142-146 to provide viewers with access to live streams of its broadcasts as well as streams of television show episodes and sporting events. In some cases, the content distributor is owned/operated by the content owner.

Content distributor 142 has a data center that is provided with network access by backbone ISP 132. Though represented here by a single node (also referred to herein as a "CDN node"), content distributor 142 may typically have multiple data centers (not shown) and may make use of multiple backbone or other ISPs. Content distributor 144 has a data center that is provided with network access by backbone ISP 134. Advertisements are served to various clients via ad servers 150-152.

Suppose a user of client 172 (hereinafter "Alice") would like to watch a live soccer game owned by XYZ. Client 172 includes a web browser application. Alice uses the web browser application to navigate to a portal owned by XYZ, such as "http://xyztvnetwork.com/livegames." Her request for the game is directed to a CDN node that is closest to her. In this case, CDN 146 is the fewest hops away from her client. Her client then begins streaming the content from CDN 146, which is in turn rendered in her browser (e.g., via a Flash or Silverlight player). Advertisements, associated with the portal, are served to her by ad server 150.

In addition to CDN 146 and ad server 150, Alice's client is also in communication with content distribution monitor 102. As will be described in more detail below, client 172 provides status information (also referred to herein as a "heartbeat"), on a recurring basis, to content distribution monitor 102.

The status information includes a variety of telemetry data such as information that captures the quality of the user experience (e.g., video stream quality), and information pertaining to user behavior. Examples of quality metrics include: the length of time it takes for the soccer game video to start playing, the number of buffering events (if any), the length of buffering events, and the number of frames per second rendered by the video player. Examples of user behavior include: starting and stopping playing a video or audio stream, seeking within the stream, switching the player to full screen mode, minimizing/restoring the player, a change in the volume level of the player, and clicking on an advertisement.

As other users of clients 170-184 request content, their respective players similarly obtain content from content sources such as CDN 144 and also communicate status information (also referred to herein as telemetry information) to content distribution monitor 102. Such players may be browser-based as with Alice's, or they may be standalone applications, as applicable. In various embodiments, all clients in the environment provide status information to content distribution monitor 102.

As will be described in more detail below, different clients may provide content distribution monitor 102 with different levels of detail, and may also do so with differing frequency. For example, client 178 is a smartphone with less powerful hardware than client 172 and more limited bandwidth. It is configured to provide less information to content distribution monitor 102 than client 172 and also does so less frequently than client 172.

Content distribution monitor 102 collects and processes the information received from Alice's client along with other clients. The collected information is made available in real-time to control entities/operators and can be used to detect and remedy problems in the content distribution. Examples of such problems include excessive buffering, freezing, and frame skipping. Additional information pertaining to delivery resources (e.g., CDN 142) and network providers (e.g., ISP 126) is also made available, as is other information pertaining to clients such as demographic information.

In the example shown in FIG. 1, a single content distribution monitor 102 is used. Portions of content distribution monitor 102 may be provided by and/or replicated across various other modules or infrastructure depending, for example, on factors such as scalability and availability (reducing the likelihood of having a single point of failure), and the techniques described herein may be adapted accordingly. In some embodiments content distribution monitor 102 is implemented across a set of machines distributed among several data centers. A Resilience Service Layer (RSL) can also be used to ensure that the monitoring service is not disrupted when/if a subset of machines fail or a subset of data centers hosting the content distribution monitor are disconnected from the Internet.

Examples of Client Architecture

In various embodiments, the collection of status information and the reporting of that information to the content distribution manager are performed by a "monitoring module" included in the client.

Figure 2A:
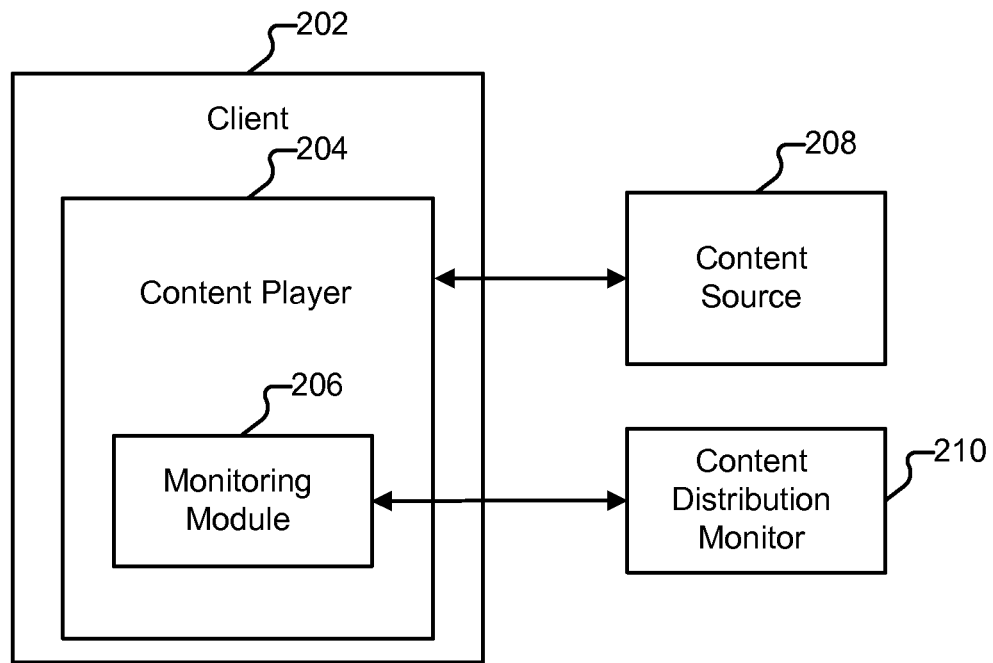
FIG. 2A illustrates an embodiment of a client.

FIG. 2A illustrates an embodiment of a client. In the example shown, client 202 includes a content player application 204 which in turn incorporates monitoring module 206. Content is received by the player from content source 208. Monitoring module 206 is in communication with content distribution monitor 210.

In the example shown, module 206 is implemented in ActionScript and deployed as an SWF library that is dynamically loaded by player 204. In Flash, the NetStream( ) class is mainly responsible for streaming, buffering, and playing the video. The monitor is implemented as an element in the content player which wraps the video element, and provides the same interface as the video element, as described in more detail below.

Module 206 can also implemented using other approaches, such as in the .NET platform for Silverlight and deployed as a DLL library that is dynamically loaded by player application 204. In Silverlight, the MediaElement( ) class is mainly responsible for streaming, buffering, and playing the video. The monitor is implemented as an element in the content player which wraps the video element, and provides the same interface as the video element, as described in more detail below.

Examples of some of the information collected by monitoring module 206 include the following, expressed in key-value pairs:

(player_state, "buffering"): The stream is buffering.
(buffer_length, 5 s): The current buffer length is five seconds.
(join_time, 3 s): The join time was 3 sec.
(frame_per_second, 30): The number of frames per second is 30.
(player-mode, "Full Screen"): The player is running in full-screen mode.

Figure 2B:
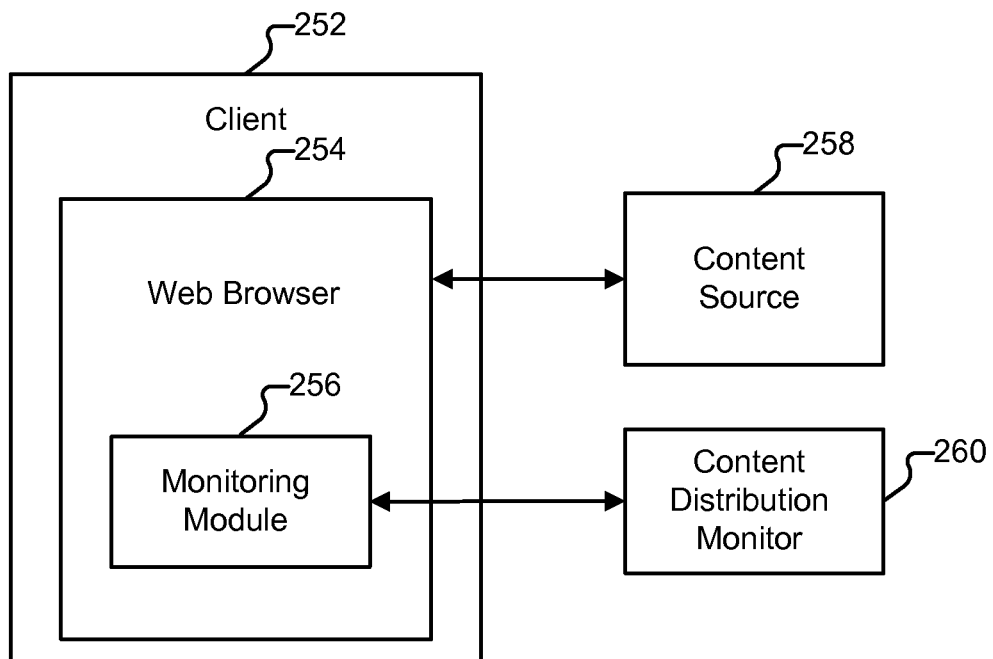
FIG. 2B illustrates an embodiment of a client.

FIG. 2B illustrates an embodiment of a client. In the example shown, client 252 includes a web browser application which in turn incorporates monitoring module 256. Content is received by the player from content source 258. Monitoring module 256 is in communication with content distribution monitor 260. In the example shown, module 256 is implemented in JavaScript. The monitor periodically collects information about the current web page and the browser. Examples of some of the information collected by monitoring module 256 include the following, expressed in key, value pairs:

(browser_minimized, "yes"): The browser window is minimized.

(tab_visible, "no"): The tab containing the web page is not visible.

(pointer_pos, "x, y"): The position of the pointer on the web page.

(banner_display", "ACMECars"): The banner ad on the web page is for ACME Cars.

As explained above, the monitoring module can be implemented in a variety of ways. For example, the monitoring module can be included in the client's player by the author of the player. The monitoring module can also extend the functionality of an existing player, such as by being implemented as a plugin, library, or standalone application (e.g., a helper application). Various examples of techniques for integrating a monitoring module with an existing player will now be described.

In one embodiment, the monitoring module is a wrapper around the lowest level streamer module (e.g., "NetStream" in Flash, or "MediaElement" in Silverlight). The player uses the wrapper, which provides the same or enhanced version of the API provided by the streamer module, to stream video. Logic in the wrapper captures the appropriate telemetry data.

Example. "ConvivaNetStream" extends and wraps "Net-Stream":

var ns:NetStream=new ConvivaNetStream( )
ns.play(<stream>);

In a second embodiment, the monitoring module exists as a side attachment and is not present in the code path for streaming to occur. The player passes the streamer module to the monitoring module either directly or through a proxy module. The monitoring module reads properties and listens for events from the streamer module or proxy module to collect data. The proxy module method prevents the monitoring module from interfering with the streaming.

Example 1.
var ns:NetStream=new NetStream( )
ns.play(<stream>);
LivePass.createMonitoringSession(ns);

Example 2. "NetStreamProxy" wraps "NetStream," but prohibits any calls that may adversely impact "NetStream":
var ns:NetStream=new NetStream( )
var nsProxy:NetStreamProxy=new NetStreamProxy(ns);
ns.play(<stream>);
LivePass.createMonitoringSession(nsProxy);

In a third embodiment, the monitoring module is built into the streamer module. The player uses the streamer module. The monitoring module within collects data.

Example
var ns:NetStream=new NetStream( )
ns.play(<stream>);

Additional Status Information Examples

As mentioned above, clients downloading/streaming content from content providers are also in communication with content distribution monitor 102 on a recurring, time-driven basis. Each heartbeat contains a snapshot of the session state at the time the heartbeat was sent out and a summary of the events and measurements since the last heartbeat or since the start of the session, as applicable. Examples of information that can be included in a heartbeat (though need not be present in every heartbeat) include the following:

version: The version of the heartbeat.

clientID: A unique identifier associated with the client's monitoring module (described in more detail below) when it is downloaded/installed on the client.

clientVersion: The version of the monitoring module.

customerID: An identifier associated with an entity such as XYZ or Studio.

sessionID: A unique identifier associated with the content viewing session.

objectID: A unique identifier associated with the content being streamed. In Alice's case, this is the soccer game.

currentResource: The source from which the content is currently being obtained. In Alice's case, this is CDN 146.

candiadateResourceList: A list of potential sources from which the player can obtain the content. In Alice's case, this could include CDN 144, CDN 142, cache 148, etc. The "currentResource" is one resource in the "candidateResourceList."

resourceUsage: The number of bytes loaded/streamed since the start of the session.

currentBufferSize: The current buffer size.

minBufferSize: The minimum buffer size during the previous heartbeat interval.

maxBufferSize: The maximum buffer size during the previous heartbeat interval.

numBufferEmptyEvents: The number of buffering empty events since previous heartbeat.

currentBitrate: The bitrate at which the content is currently streamed.

playheadTime: For video-on-demand content (i.e., not a live event), this is the time offset of the stream file.

currentlyPlaying: For live content, this is the time offset of the stream since the player started.

joinTime: The amount of time that it took the player to enter the player state for the session.

averageFPS: The average rendering frame per second (FPS) at which the content was rendered since the last heartbeat.

encodedFPS: The FPS at which the content was encoded.

averageFPS: Can be lower than the "encodedFPS" if the client's CPU is unable to render the content at the "encodedFPS" or if the client cannot stream the content fast enough.

totalPlayTime: The total play time since the beginning of the session.

totalBufferingTime: The total buffering time since the beginning of the session.

totalPauseTime: The total pause time since the beginning of the session.

totalSleepTime: The total sleep time since the beginning of the session. The client is in a sleep state if the client is suspended.

sessionTime: The total time elapsed since the session started.

currentState: The state of the player when the heartbeat was sent. Examples of player states include: play, pause, buffering, joining, and seeking.

numRateSwitches: The number of bitrate switches since the beginning of the session.

numResourceSwitches: The number of resource switches since the beginning of the session.

rateSwitchingEvent.time: The time at which a bitrate switch was attempted, measured from the start of the session.

rateSwitchingEvent.from: The bitrate of the stream at the time the switch was attempted.

rateSwitchingEvent.to: The target bitrate of the switch.

rateSwitchingEvent.result: Indicates whether the switch was successful or not. For example, a switch may not be succeed if the client cannot sustain the "rateSwitchingEvent.result" bitrate.

resourceSwitchingEvent.time: The time at which a resource switch was attempted, measured from the start of the session.

resourceSwitchingEvent.from: The resource from which the content was streamed at the time the switch was attempted.

resourceSwitchingEvent.to: The target resource for the switch.

resourceSwitchingEvent.results: Indicates whether the switch was successful or not.

errorList: A list of errors encountered from the start of the session.

Figure 3:
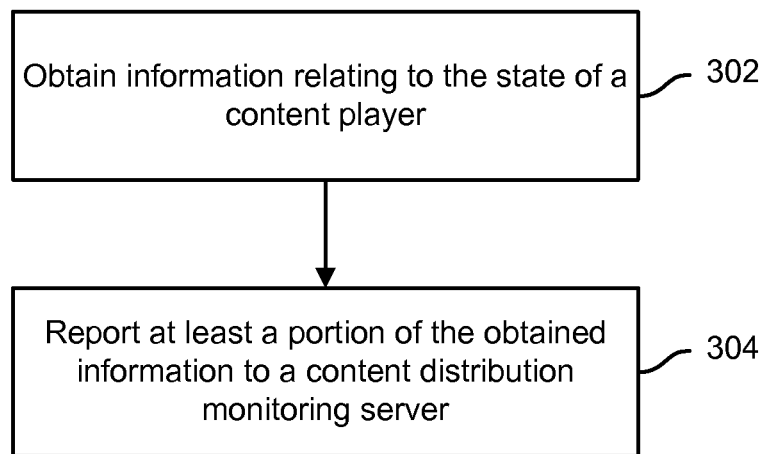
FIG. 3 illustrates an example of a process for monitoring the performance of a content player.

FIG. 3 illustrates an example of a process for monitoring the performance of a content player. In some embodiments the process shown in FIG. 3 is performed by a client such as client 172. The process begins at 302 when information relating to the state of a content player is obtained. For example, at 302, client 172 collects various information pertaining to the video player that Alice uses to watch the streaming soccer game. Information such as the amount of time an advertisement took to load and which ad server supplied the advertisement is also obtained. In some embodiments, additional processing is performed in the collected information. Examples include computing averages, minimums, maximums, and the $x^{th}$ percentile over the last few samples.

At 304, at least a portion of the obtained information is reported to a content distribution monitoring server. For example, at 304, client 172 sends a heartbeat to content distribution monitor 102, including some or all of the information collected at 302. Information sent at 304 can also include processed results such averages and minimums, instead of or in addition to raw data.

In various embodiments, the process shown in FIG. 3 repeats throughout a content playing session. The process may repeat regularly (e.g., once every second), and may also repeat with varying frequency.

The amount of data reported by the client in a heartbeat to content distribution monitor 102 can affect the scalability of the content distribution monitor. The amount of data collected and reported by the client can also potentially impact the performance of the client. If the client is otherwise resource constrained (e.g., due to other processes, or due to hardware limitations), adjustments can be made to how much information is collected and with what frequency. For example, suppose the buffer size is expected to be of size three seconds. The time period employed by the monitoring module can be set to one second or a few hundred milliseconds. The adjustment can be dynamically adjusted as needed. The period can be decreased if the buffer grows and increased if the buffer shrinks, thus minimizing overhead while still being able to detect a low buffer size which can impact the video quality.

The amount of data sent can be adjusted according to two parameters: the heartbeat "period," and the size of heartbeats, both of which can be adaptively changed by either the client or the content distribution monitor as needed. For example, if the quality experienced by the client is acceptable, the client may reduce the heartbeat frequency. This can entail collecting state information less frequently and can also entail sending collected information less frequently. If the quality degrades, the client can increase the heartbeat frequency accordingly. As one example, client 172 can employ a rule that, as long as the buffering ratio is less than or equal to 0.5%, the heartbeat period is 30 seconds. If the buffering ratio is between 0.5% and 1% the heartbeat period is adjusted to 20 seconds. If the buffering ratio is equal to or greater than 1%, the heartbeat period is adjusted to 10 seconds.

Content distribution monitor 102 can also direct client 172 to increase or decrease the heartbeat frequency based on factors such as the current load on the content distribution monitor (or applicable component thereof). For example, if the load on content distribution monitor 102 exceeds a predefined threshold, clients are instructed to increase the heartbeat interval and/or reduce the detail of the information sent in a heartbeat.

As one example, content distribution monitor 102 can employ a rule that, if its resource utilization exceeds 80%, clients are instructed to double their respective heartbeat intervals. Monitor 102 can also selectively send such instructions to clients. For example, clients with periods under 30 seconds can be instructed to double their periods, while clients with periods above 30 seconds are not sent such instructions.

As another example, when monitor 102's utilization exceeds 80%, it can instruct clients to reduce heartbeat size by sending less information. This can be less detailed information (e.g., sending only the number of resource switches, instead of the detailed information about these switches), or can include aggregate measurements about certain events instead of sending individual details. If the client is already aggregating certain information, the measurements can be aggregated over a longer time interval (e.g., 10 seconds instead of 2 seconds). Additional examples follow.

Instead of sending every buffering event, send the aggregate time the session spent in the buffering state since the last heartbeat.

Instead of sending every measurement of the rendering rate, send the average over the entire heartbeat interval.

Instead of sending information about a switch event at the time when the switch event happened, store the event on the client and send it with the next heartbeat.

Figure 4:
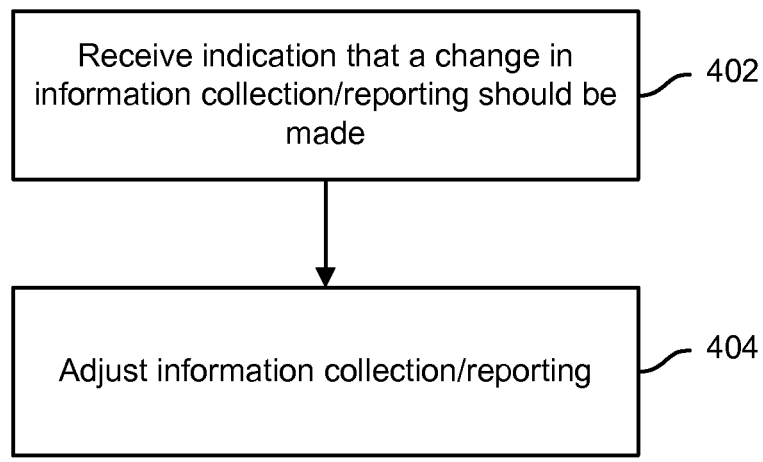
FIG. 4 illustrates an example of a process for dynamically adjusting a heartbeat.

FIG. 4 illustrates an example of a process for dynamically adjusting a heartbeat. In some embodiments the process shown in FIG. 4 is performed by a client such as client 172. The process begins at 402 when an indication is received that a change should be made to either the collection, or reporting of status information (or both). As explained above, the indication can be received as an instruction from content distribution monitoring server 102, and can also be received as the result of a determination made by the client itself. At 404, an adjustment is made to the collection/reporting of status information implicated by the indication received at 402.

Inferring State Information

In some cases, the monitoring and reporting functionality described herein as being provided by a client is wholly integrated with the player itself. For example, Studio might make available a custom player application that can be installed on a client by users that want to watch Studio films. The customer player includes all of the necessary logic to provide complete heartbeat information, and also includes logic for communicating with the content distribution monitor, adjusting the frequency with which status information is communicated to the content distribution monitor, and other functionality described herein. However, depending on the player deployed on a client, not all of the example heartbeat information described above may be directly accessible for collection and transmission. For example, the Flash player plugin used by Alice to view the soccer game does not provide direct access to its state. Using the techniques described herein, content distribution monitor 102 can nonetheless be provided with the state of the player.

In some embodiments, a monitoring module is embedded in the content player deployed on the client. For example, when Alice directs her browser to XYZ's website, a custom Flash-based player is loaded. The custom player has direct access to the API of the video plugin. Possible states of the player are as follows:

Playing: The player's buffer is not empty, and the player renders frames on the screen.

Buffering: The player's buffer is either empty or is less than a predefined threshold, making it impossible for the player to render new frames.

Joining: The player has just connected and has not yet accumulated enough data in its buffer to start rendering frames.

Pause: The player is paused, usually, as a result of a user action. During the pause state, no new frames are rendered even if the buffer is full.

Sleep: The client is suspended.

In the case of the aforementioned Flash player, NetStatus events provided by the player can be used to infer the state, as described below:

Buffering: When one of a NetStatus.Buffer.Empty, NetStream.Play.Start, or NetStream.Play.Reset events is received, an inference is made that the player is buffering data and the video is not playing. For live RTMP streams, the mentioned events might not be available. In that case, if the playhead time has stopped moving and there is no data in the content player buffer, an inference is made that the player is buffering data and the video is not playing.

Playing: When a NetStatus.Buffer.Full event is received, an inference is made that the player is playing video. If the player is currently in a Paused state and the playheadTime starts to move, an inference is made that the player is playing video.

Paused: If the playheadTime does not progress for 1.6 seconds, an inference is made that the player is paused.

Sleep: If the amount of time that has elapsed between two firings of a periodic one second timer is greater than 30 seconds, an inference is made that the client has been in a sleep mode since the last firing of the timer.

Stopped: For HTTP streams, when a NetStatus.Play.Stop event is received, an inference is made that the stream has ended. For RTMP streams, when a NetStatus.Play.Complete event is received, an inference is made that the stream has ended. When a NetStatus.Play.Stop is received, an inference is made that the download has finished, but the stream is still playing.

Error: If the stream stays in stopped state for fifteen seconds at the start of a session, an inference is made that it has failed to connect.

In addition to the player states described above, an additional state can also be inferred:

Zombie state: An inference is made that the player is in a zombie state (a non-operating state with no user actively using it) if it persists in a non-playing state for more than a specified time. Once the player is in a zombie state, the transmission of heartbeats to content distribution monitor 102 is halted. Reporting will resume if the player returns to a playing state. Non-playing states include: "Buffering," "Paused," "Stopped," and "Error."

In addition to the player states, the monitoring module monitors various metrics, including the number of bytes downloaded/streamed since the session started, the bitrate of the stream, and the rendering rate.

Some players, such as the Flash 9 plugin, do not provide a direct API from which the number of bytes streamed/downloaded or the stream bitrate. Nonetheless, a variety of techniques can be used to obtain or estimate the bitrate. As one example, the developer of the player might expose the bitrate through an API call.

Another technique for obtaining a bitrate is to use metadata associated with the content. For example, suppose metadata is made available through a configuration file associated to the content. The configuration resides on an origin server such as origin server 198 and also includes other information such as the title of the content, its genre, and a list of CDNs where the content is available.

Yet another technique for obtaining a bitrate is to examine the content URL. For example, a movie might be accessible at the URL http://www.CDN-C.com/Studio/JaneEyre300 Kbps. In this case, the bitrate of the content is likely to be 300 Kbps.

An estimation of the stream bitrate can also be made. The estimation, along with the amount of time the player was in the playing state, and the size of the buffer, are used to estimate the number of bytes downloaded/streamed. As one example, suppose a player streamed data at 400 Kbps, was in a playing state for 315 seconds, and at the time of taking the measurement the buffer size contained data for playing another 15 seconds. The total number of bytes downloaded is: 400 Kbps*(315 seconds+15 seconds)=16 MB.

In the event that the bitrate is available through multiple of the above techniques, in various embodiments each applicable approach is used, in a specified order, until a valid bitrate (e.g., greater than 0 and less than 10,000 kbps) is obtained.

The number of bytes downloaded can be estimated as (totalPlayingTime+bufferLength)*bitrate. If multiple bitrates are used, in some embodiments the bytes downloaded is estimated as the sum of totalPlayingTime [bitrate] *bit-rate+bufferLength*currentBitrate.

Rendering quality is another example metric that can be obtained and provided to content distribution coordinator 102. Rendering quality is the ratio between the frames per second (FPS) rendered by the player and the FPS at which the stream was encoded.

Some players do not directly provide the information needed to compute the rendering quality. For example, Flash 9 has an API that exposes rendered frames per second, but not encoded frames per second. One technique to compute the encoded FPS, in such a scenario, is as follows. The rendering FPS is measured and an assumption is made that the encoded FPS is the maximum FPS observed over the course of the session. Another technique is to estimate the encoded FPS as the maximum of a three second sliding average of rendered FPS sampled five times a second.

In order to ensure accurate accounting of the player status over the course of the session, it is important to determine the time intervals when the system is in sleep or suspend mode. These intervals can be detected using notification APIs provided by the system for this purpose. For systems that do not provide such API (e.g., Flash Player, or Silverlight), the intervals can be estimated by setting a timer to fire at periodic intervals (e.g, every 1 second). At each firing of the timer the current system time is recorded, and the time elapsed since the last firing is computed. If the time elapsed is greater that a given threshold (e.g., 10 seconds), an inference is made that the given elapsed time interval was spent in sleep or suspend mode.

Inferring Player Capability Information

The following are example player capabilities that impact the quality of the video experience: processing speed, video rendering capabilities, amount of memory available, and amount of bandwidth available.

Processing speed: The monitoring module can use the API of the content player, or the underlying platform to read the processing speed of the player. For example, if the content player is implemented on the Silverlight platform the monitor can use the Environment.ProcessorCount to obtain the count of the processors available. For platforms whose API does not provide direct reading of processing speed capabilities, the monitoring module can derive it by using a timer to measure the time required to perform a fixed CPU-intensive computation.

Video rendering capabilities: Some content players have the ability to use hardware acceleration to render video. The monitoring module can determine the speed at which the content player can render video, either by using the API of the content player or the underlying platform. For example, a monitoring module using the Flash platform can use the flash.system.Capabilities.ScreenResolutionX to determine the screen resolution.

Available memory: The amount of available memory has a direct influence on how well the content player can support rendering video while performing the computation required for monitoring and other user-interaction tasks. The monitoring module can obtain the amount of available memory by using the API of the underlying platform. For example, a monitoring module using the Flash platform can use the API flash.system.System.totalMemory to termine how much memory is available.

Available download bandwidth: The available download bandwidth has a direct impact on the quality of the video stream that can be downloaded and played. The monitoring module can infer the available bandwidth by measuring the time interval it takes to download a fixed size file from the server. Alternatively, the underlying platform can provide API that can be used to determine the download bandwidth. For example, a player using the Flash platform can use the API flash.net.NetStreamInfo.currentBytesPerSecond.

Figure 5:
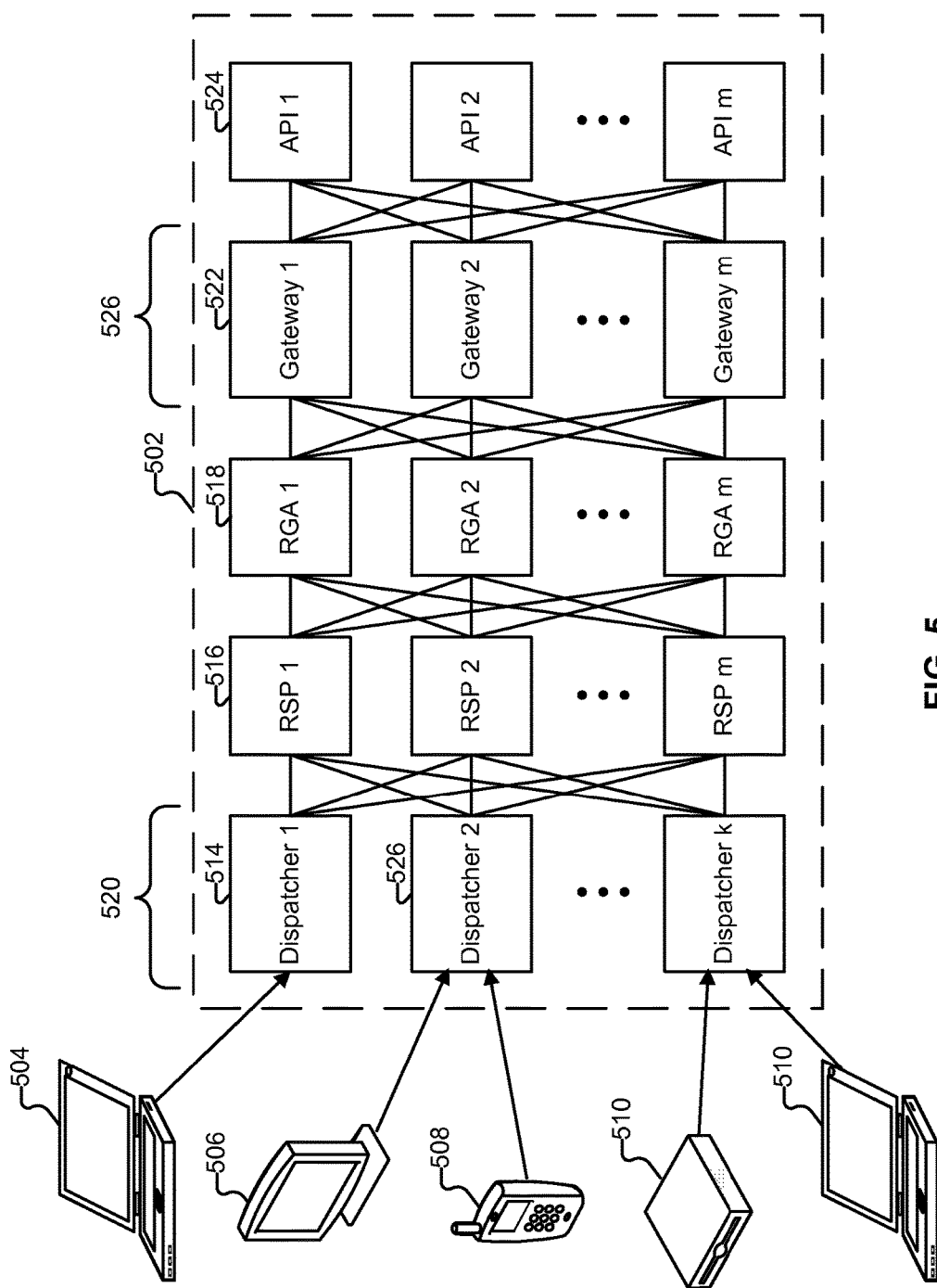
FIG. 5 is an illustration of an environment in which status information is received and processed.

FIG. 5 is an illustration of an environment in which status information is received and processed. In various embodiments, the services provided by content distribution monitor 102 are implemented across a scalable infrastructure, particularly in embodiments where telemetry data is received from all clients. In the example shown, the elements contained within dashed region 502 collectively provide the functionality of content distribution monitor 102. Each of the layers (e.g., dispatcher layer 520) is horizontally scalable and their respective components can be implemented on standard commercially available server hardware (e.g., having a multi-core processor, 4G+ of RAM, and Gigabit network interface adaptors) running a typical server-class operating system (e.g., Linux).

Clients 504-512 each include a monitoring module that collects status information. When the monitoring module on a client is activated, the client is mapped to a dispatcher server. As one example, when the monitoring module starts, it reads a configuration file that includes a list of dispatcher servers. The monitoring module selects a dispatcher server at random from the list.

A dispatcher server (514) includes two conceptual modules. The first module implements a communication interface for receiving status information from clients. In some embodiments the module is implemented using an off-the-shelf web server, and allows clients to connect over the HTTP protocol (and also allows clients to securely communicate via SSL). Data received by the first module is passed to the second module. The second module normalizes the data (to a format suitable for further processing) and passes the normalized data to a real-time stream processing component (516).

The real-time stream processing (RSP) layer includes an optimized software component that processes the telemetry data that it receives from the dispatcher in real-time. A dispatcher sends all heartbeats belonging to the same session to the same RSP component.

In some embodiments the RSP component is implemented as a continuously running service that reads and processes the telemetry data received from dispatchers via the network over TCP. The telemetry data stream comprises individual records, each of which represents the telemetry data sent by the monitoring module. The RSP component reads network data one record at a time and parses the data into a local data representation. The data received by the RSP component can be stored as in-memory hash tables of records allowing fast execution, and very high throughputs. Since the RSP component does not require old information, it can periodically purge the in-memory hash tables and increase scalability accordingly. In other embodiments, optimized in-memory databases are used.

A mapping function to map heartbeats having a session identifier "ID" to a particular RSP component "i" as follows:
i=hash(ID) mod m,
where hash( ) is a hash function and "m" is the total number of RSP components.

Once an RSP component parses the data records, it performs two main tasks. First, it performs data filtering. A filter is a logical expression and is installed at each RSP component instance. As one example, the following filter would identify viewers located in San Francisco, connected to ISP SP1, streaming from CDN A, one of two particular shows:

(city="San Francisco" AND ISP="SP1" AND CDN="CDN A" AND ((show="NewsAt10") OR (show="SundayMagazine"))

For each message of incoming telemetry data, the (key, value) pairs in the record are matched against the filter. If the filter is matched, the data is associated with the filter.

The second task performed is to compute snapshots and on-line statistics over the telemetry data matching each filter. One example of a snapshot is the number of players that are in a particular state (e.g., "playing"). The RSP component generates sequences of these snapshots (e.g., one every second). Examples of statistics computed by the RSP component include: the average number of bytes played over all video streams matching a filter over a given time interval (e.g., 10 seconds) and the minimum frames per second experienced by a stream matching a filter over a time interval. Snapshots and statistics are updated continuously, from new telemetry data received from clients.

The RSP component provides its computed snapshots and statistics to a real-time global aggregation component (518). The real-time global aggregation (RTGA) component aggregates the information provided by the RSP component for each filter specified by a user (described in more detail below).

As explained above, each RSP component (516) receives (via a dispatcher) telemetry data from a subset of the monitoring modules and calculates snapshots and statistics for all filters. Each RGA component instance is in turn responsible for a subset of the filters. Based on the identifier of the filter, all RSP components send data for that filter to a single RGA component. The RGA component combines the data from all RSP components for the filters that it is responsible for, resulting in a global snapshot and statistics based on information from all monitoring modules. Examples of aggregation operations performed by an RGA component include: counting the total number of viewers that match a particular filter, determining the percentage of viewers matching a given filter that are in buffering state, the join time distribution experienced by viewers joining a given stream, the current number of viewers in a given city, the rank of the most popular live events, and so on.

In some embodiments an RGA component's functionality is implemented as a continuously running service. It reads records sent by the RSPs asynchronously, thus achieving a high throughput. The RGA component stores the records it receives in in-memory hash tables allowing optimized access for real-time processing. Old information is periodically purged from the hash tables to improve efficiency.

As shown in FIG. 5, gateway 522 provides a web service API 524 for accessing data. Through the API, RGAs data is available on a per-filter basis. In addition, it also exposes APIs to edit and install new filters and aggregation functions. In some embodiments gateway 522 is implemented using an off-the shelf web server (such as Apache) with customized code to handle the various web service API calls. The handlers return data for a given web API call in various data formats including XML, JSON, SOAP, and HTML, as applicable. The handlers serve as middleware for querying and interactively controlling the RSPs and RGAs.

Gateway 522 also provides access controls and persistently stores the information regarding the API requests, data access and presentation policies, and filter descriptions. The information is maintained in a persistent database, such as mySQL or Oracle database.

Automatically Detecting and Resolving Content Distribution Problems

As explained above, content distribution monitor 102 aggregates telemetry information from all clients, processes the information, and, as will be explained in more detail below, allows users (e.g., via a user interface) to view the multi-dimensional results in realtime. Examples of dimensions include:

Client properties: Including browser type and version, player type and version, operating system, CPU speed, connection type, IP address, geographic location, language, autonomous system, and ISP.

Content properties: Including category, title, show, episode number, duration, encoding format, encoding quality, and language.

Content source properties: Including CDN, data center, and clients served.

User properties: Including whether the user (of the client) is a premium or free user, and returning or first-time visitor.

Accordingly, using the techniques herein, one is able to track, in realtime, granular information such as the quality experienced by viewers located in Denver, connected to SP2, and streaming videos from CDN B, using Flash Player 10. Further, by aggregating and correlating the data it receives from all clients, content distribution monitor 102 exposes, in realtime, the performance of content sources and network providers. (ISPs). Problems in content delivery can be automatically detected by examining the results.

Figure 6:
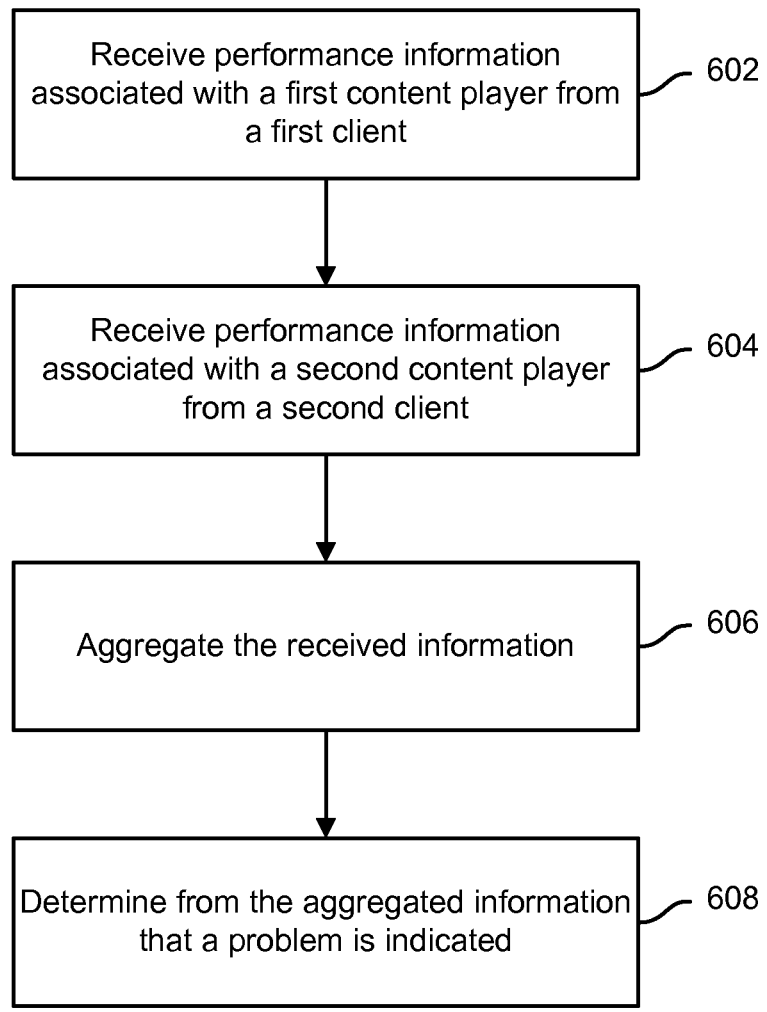
FIG. 6 illustrates an example of a process for detecting a problem in a content distribution.

FIG. 6 illustrates an example of a process for detecting a problem in a content distribution. In some embodiments the process shown in FIG. 6 is performed by content distribution monitor 102. The process begins when information associated with a first content player and a second content player is received from a first client (602) and second client (604), respectively. For example, at 602, telemetry information is received from client 504 by dispatcher 514. At 604, telemetry information is received from client 506 at dispatcher 526. At 606, the received information as aggregated. For example, at 606, distributed processing of the received data is performed by the RSP and RGA layers. Finally, at 608, a determination is made from the aggregate information that a content distribution problem is indicated. For example, at 608, gateway 522 determines that the CDN from which client 504 is obtaining content is experiencing a problem. Specific examples of analysis and diagnosis will now be given.

Example: Diagnosing Client Problems (Single Client, Single CDN)

Suppose a content owner, such as Studio-A, distributes its content via a single CDN, such as CDN C. Suppose that the content is encoded at multiple bitrates B1 and B2 where B1<B2. If a client A is able to sustain the download rate, but detects problems rendering the frames, an inference can be made that the client A likely has problems with its CPU utilization. An example of performing such an inference follows.

Observe the client buffer size over a period of time T (e.g., T=10 seconds) when the client is streaming at bitrate B2. Observe the rendering quality measured using dropped frames reported by the player. If the client buffer size is greater than B_threshold (e.g., B_threshold=0.5*B_max) at all times during the period of observation, and the rendering quality is less than R_threshold_1 (say, R_threshold_1=0.6), then a conclusion can be made that the client cannot sustain displaying bit-rate B2 due to CPU issues on the client.

Perform the same observation with the client playing at bit-rate B1. If the client buffer size is greater than B_threshold (e.g., B_threshold=0.5*B_max) at all times during the period of observation, and the rendering quality is greater than R_threshold_2 (e.g., R_threshold_2=0.75), then a conclusion can be made that the client can sustain displaying bit-rate B1.

A numerical example is now provided. Consider a setting where a client streams a 1 Mbps stream for 10 seconds with buffer size varies between 9 and 10 seconds. Suppose that B_max is 10 seconds and B_threshold is 5 seconds. Assume that the rendering quality at 1 Mbps is 0.55 over this interval. When the client plays a 500 kbps stream instead, the buffer size is in the same range (9-10 seconds), but the rendering quality is 0.9 instead. Then, assuming that R_threshold_1=0.6 and R_threshold_1=0.75, a conclusion can be made that the client can sustain 500 kbps but not 1 Mbps.

Example: Diagnosing CDN Problems (Single Client, Two CDNs)

Suppose a content owner, such as Studio-A, distributes its content via two CDNs, such as CDN D and CDN E. If a client A is able to sustain the download rate from CDN D, but not CDN E, then the client can conclude that CDN E has problems streaming to client A. An example of performing such an inference follows.

Compute an aggregate quality metric Q using various measurements from the client over a time T (e.g., T=60 seconds). Examples of measurements which can be directly used as the metric Q across a group of clients over a time T include:

buffering ratio: The total number of seconds the client experienced buffering divided by the total playing time of the clients during interval of time T.

join time: The average joining time over all clients during time T over a group of clients.

join failures: The fraction of cases (across all attempts) where the join failed during time T.

If the quality Q is greater than a threshold T1 (e.g., T1=0.95) for CDN D, but lower than another threshold T2 (e.g., T2=0.50) for CDN E, then a conclusion can be made that CDN E has problems streaming to client A.

One example remedial action that can be taken at the client is to select CDN D for streaming the current stream, or use it first for future streams.

A numerical example is provided. Consider a setting where a client M streams from CDN D and experiences a buffering ratio of 0.5 over K1 attempts and time T1. Also, client M streams from CDN E, and over K2 attempts and time T2 experiences a buffering ratio of 0.02. In this case, given that K1 and K2 are above a threshold (e.g., both greater than 2), and T1 and T2 are above a threshold (e.g., both are greater than 10 minutes), a conclusion can be made that CDN D has problems streaming to the client. A further refinement can be performed by computing the buffering ratio for each of the K1 (or K2) streaming attempts from the CDNs to the client. In this case, it can be stated that CDN D has problems streaming to client M if more than 75% of the attempts from CDN D (out of the K1 attempts) have buffering ratio greater than 0.5, and more than 75% of the attempts from CDN D have buffering ratio less than 0.02.

Example: Two Clients in the Same Location Using Different ISPs Both Streaming from a Single CDN Suppose a content owner, such as Studio XYZ, distributes its content via a single CDN, such as CDN C. The CDN comprises several geographically distributed servers. As clients request content, they are assigned to a particular server based on their geographical location. If many clients at the same geographical location, but using different ISPs, experience quality problems, an inference can be made that the CDN servicing that geographical location is having a problem. Note that since XYZ also uses the services of CDN C, the experiences of clients obtaining XYZ's content from the same location can be included in the analysis. One way this analysis can be implemented on content distribution monitor 102 is as follows.

First, obtain location and network information for all clients. Examples of location information include city, state, country, DMZ code, and geographic coordinates. The location information can be obtained in a variety of ways, such as by providing the client's IP address to a geo-location service such as Quova. Also obtain network information such as Autonomous System Number (ASN) information and ISP information for the client.

Second, group clients based on their ASN and one geographic attribute, such as DMZ code, city, or state. Let G(ASN1, Geo1) denote the set of clients connected to a specific ASN, ASN1, which have the same geographic attribute value, Geo1.

Third, compute an aggregate quality Q for each group G(ASN, Geo) over last T seconds. Denote this aggregate quality by Q(G(ASN, Geo). Examples of quality metrics are provided above.

Finally, for each Geo attribute value Geo1, check whether there are at least two group of clients connected via different ASNs. If the aggregate quality of a certain fraction F of the groups is greater than a threshold BufferingThreshold1, then conclude that the CDN is experiencing problems serving the clients at location Geo1. In some embodiments a minimum group size is defined so that only groups having a number of clients larger than a given threshold are considered. As one example, the fraction F is selected between 0.75 and 1.

A numerical example is now provided. Consider a system setting where BufferingThreshold1=0.1, MinGroupSize=200, and F=1.0. Based on an analysis of Their IP addresses, 20,000 viewers are determined to be located in San Francisco, connected to CDN C, and watching a new release by Studio. Assume 5,000 clients are connected to ASN1 belonging to SP1; 5,000 clients are connected to ASN2 belonging to SP2; 9,900 clients are connected to ASN3 belonging to SP3; and 100 clients are connected to ASN4 which belongs to a wireless company. Four groups exist: G(SF, ASN1), G(SF, ASN2), G(SF, ASN4), and G(SF, ASN4), respectively.

Each client reports for each session (a) the total time it spent in buffering during every 10 second interval; and (b) the total playing time during the same 10 second interval. For example, suppose a user Charlie has the IP address 1.2.3.4 which belong to ASN1, and watches the stream with the URL rtmp://www.CDNC.example.com/12346/video.flv. Charlie reports in a particular heartbeat that he has experienced 1 second of buffering and 9 seconds of playing time. Another user, Bob, has the IP address 2.3.4.5 which belongs to ASN3, and watches the stream with the same URL. Bob reports in a particular heartbeat that he has experienced 0.5 seconds of buffering and 5 seconds of playing time. Bob's player spent the remaining 5 seconds in pause state. The pause time is not used in the computation of the buffering ratio.

Content distribution monitor 102 computes over each interval of time T=5 minutes, the aggregate average buffering ratio, defined as the (1) the total buffering time experienced by all sessions in a group during T divided by (2) the total playing time over all sessions in the group during the same time interval T. The aggregate quality ratio for each of the four groups is as follows:

Q(G(SF, ASN1))=0.14, Q(G(SF, ASN2))=0.21, Q(G(SF, ASN3))=0.18, Q(G(SF, ASN4))=0.04.

Since the number of clients in G(SF, ASN4) is less than MinGroupSize, the diagnosis analysis ignores this group. Also, since the buffering ratio of all remaining groups is greater than BufferingThreshold1, a conclusion is made that CDN C experiences quality issues serving clients in San Francisco.

Suppose the above example is modified such that ASN4 has 1000 clients, and Q(G(SF, ASN1))=0.02, Q(G(SF, ASN2))=0.21, Q(G(SF, ASN3))=0.18, Q(G(SF, ASN4))=0.04. In this case, an inference can be made that CDN C does not experience quality issues serving clients in San Francisco in general. The problem can then be narrowed down further and smaller or different sets of clients investigated, such as clients that are connected to ASN1 served by CDN C.

Example: Inferring Problems in a Particular ASN (Single CDN)

Suppose a content owner, such as Studio XYZ, distributes its content via a single CDN, such as CDN C. If the quality of clients at the same location but using different ISPs is very different, an inference can be made that the quality problems experienced by the clients are due to the ISP (and not due to the CDN). One way this analysis can be implemented on content distribution monitor 102 is as follows.

Perform the first three steps of the previous diagnosis (describing the diagnosis of CDN quality issues). As a final step, let G(ASN1, Geo1) be a group experiencing low quality. If there is at least another group, G(ASN2, Geo1) at the same location experiencing high quality, then conclude that ASN1 is the cause of quality issues. In particular, a conclusion that ASN2 has quality issues is reached if, and only if, Q(G(ASN2, Geo1))−Q(G(ASN1, Geo1))>BufferingRatioDiscrepancy.

A numerical example is now provided. Consider a system setting where BufferingRatioDiscrepancy=0.1. Suppose 5,000 viewers are determined to be located in New York, connected to ASN1, and streaming a baseball game from CDN C. Another 4,000 viewers in New York are connected to ASN2 and streaming the same game from CDN C.

Each client reports for each session (a) the total time it spent in buffering during every 10 second interval; and (b) the total playing time during the same 10 second interval. The aggregate quality ratio for each group as computed by content distribution monitor 102 is: Q(G(NY, ASN1))=0.14, and Q(G(NY, ASN2))=0.03, respectively.

Since Q(G(SF, ASN1))−Q(G(SF, ASN2))>BufferRatioDiscrepancy, the quality issues are pinpointed as being ASN1.

Example: Inferring Problems with a Particular CDN (Multiple CDNs)

Suppose a content owner, such as XYZ, distributes its content via multiple CDNs (e.g., CDN A, CDN B, and CDN C). If clients at the same location and using the same ISP experience significantly different quality when connected to different CDNs, the difference in quality can be attributed to CDNs. One way this analysis can be implemented on content distribution monitor 102 is as follows.

First, obtain location and network information for all clients. Second, classify each client based on its ASN, the CDN it gets data from, and one of its geographic attributes (e.g., DMZ code, city, or state). Let $G(ASN_i, CDN1, Geo_i)$ denote the set of clients connected to a specific ASN and a geographic region (e.g., for i=1, 2, 3, 4, 5), getting data from same CDN, CDN1. One way of determining the particular CDN from which a client is receiving content is to extract it from the URL used by the client to obtain the content.

Third, compute an aggregate quality Q for each group G(ASN, CDN, Geo) over the last T seconds. Denote this aggregate quality by Q(G(ASN, CDN, Geo)).

Finally, check whether there are at least K pairs of groups that share the same ASN and geo-location, but get their data from different CDNs, and which experience different quality. In particular, let G(ASN1, CDNi, Geo1) and G(ASN1, CDNj, Geo1) be one such pair of groups. Then if Q(G(ASNi, CDN1, Geoi))−Q(G(ASNi, CDN2, Geoi))>QualityThreshold2 for greater than a fraction F of the K pairs, a conclusion is made that CDN2 has problems serving clients in general across a large set of regions. Alternatively, if this happens for smaller than a fraction F but a non-zero set, then a conclusion can be made that CDN2 has problems serving those (ASN, Geo) combinations for which the difference in quality exceeds the quality threshold.

In some embodiments, a minimum group size is defined so that only groups having a number of clients larger than a given threshold are considered.

A numerical example is provided. Content owner Charlie's Studio uses CDNs A and B for delivering content. At some point, there are 1100 streams from ISP-1 in San Francisco, 1200 streams from ISP-2 in Los Angeles, 1500 streams from ISP-3 in New York, 1050 streams from ISP-4 in Boston, 600 streams from ISP-1 in Denver, with exactly half the users in each group streaming from CDN A and the other half from CDN B. A minimum group size of 500 users streaming from a particular (ASN, CDN, Geo) group is used, and hence there are four groups to consider. A requirement of at least four pairs (K=4) exists. For CDN A, the buffering ratios for users in San Francisco, Los Angeles, and Boston is 0.3, and for users in Denver it is 0.1. For CDN B, the buffering ratio of all user groups is 0.05. The quality threshold to separate good and bad quality is 0.1, and the fraction F required is 75%. This condition is satisfied, since three out of the four groups have a quality difference between CDN A and CDN B as 0.25. Hence, a conclusion is made that CDN A is having problems streaming to users.

Example: Multiple CDNs with CDN Optimization

Suppose a content owner, such as XYZ, distributes its content via multiple CDNs (e.g., CDN A, CDN B, and CDN C). Assume that if a client connected to CDN A experiences buffering beyond a threshold, it switches to another CDN (and stays there for at least a threshold interval of time). Based on the amount of switching observed from a CDN, the relative extent of quality problems the CDNs have can be quantified. One way this analysis can be implemented on content distribution monitor 102 is as follows.

For each CDNi for a period T, determine the number of clients Ni that start with CDNi, and the number of clients Mi that start with CDNi and switch away from CDNi (i.e. count only the first switch of a client). Compute the switch fraction $SW_i=M_i/N_i$ for all CDNs. If (SWi−avg(SW)>SW_Threshold). A conclusion can be made that CDNi has quality problems in general. Similar analysis can also be performed with respect to a geographic region or an ASN restriction.

A numerical example is provided. A content owner Charlie's Studios uses CDN A and CDN B to deliver content. Over a 10-minute period, 10,000 users watch content starting streaming from CDN A, and in the course of viewing, 1000 users switch to CDN B based on client-based quality detection algorithm. In the same period, 10,000 users watch the same content starting streaming from CDN B, and out of these, 2,500 switch to CDN B. The switch fraction for CDN A is 0.1 and that for CDN B is 0.2. Switching threshold SW_Threshold is 0.1, and a conclusion is made that CDN A has quality problems in general.

Other content distribution problems can also be detected using the techniques described herein. For example, a problem with a content item itself (e.g., a particular movie) can be inferred if several clients, using different CDNs and different ISPs, experience quality issues with the same content. As another example, a problem with ad server 150 can be inferred if several clients report excessively long advertisement load times or timeouts.

A numerical example is provided. A content owner publishes 100 clips daily using two CDNs: CDN A and CDN B. One of the clips, clip X, has 100% join failures on both CDNs. Using this information, an inference can be made that there is a problem in publishing clip X. Now assume that there is 100% join failure for clients that join CDN A, but <2% of the users have problems with CDN B. Then an inference can be made that CDN A's publishing path has problems for that clip (but CDN B's does not).

Other content distribution problems can also be detected using the techniques described herein. For example, a problem with a content item itself (e.g., a particular movie) can be inferred if several clients, using different CDNs and different ISPs, experience quality issues with the same content. As another example, a problem with ad server 150 can be inferred if several clients report excessively long advertisement load times or timeouts.

In various embodiments, when problems are detected by content distribution monitor 102, corrective actions are automatically taken, either by a control module included in content distribution monitor 102, or by a separate control system, configured to work in conjunction with content distribution monitor 102.

Figure 7:
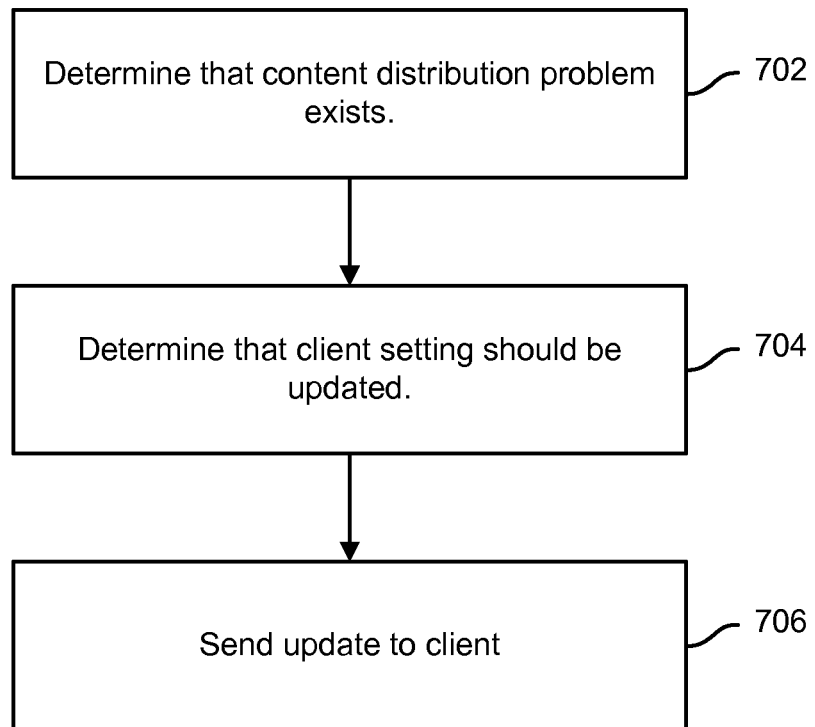
FIG. 7 illustrates an example of a process for correcting a problem in a content distribution.

FIG. 7 illustrates an example of a process for correcting a problem in a content distribution. In some embodiments the process shown in FIG. 7 is performed by content distribution monitor. The process begins at 702 when a determination is made that a problem in a content distribution exists. In some embodiments the processing of portion 702 of FIG. 7 occurs in accordance with the process shown in FIG. 6. At 704, a determination is made that at least one setting of a client should be updated, and at 706, the update is sent to the client.

As one example, suppose content distribution monitor 102 continuously monitors the quality of clients' receipt of content. If this quality drops under a predefined threshold, the control module (or control system) will try to localize the problem to one or more (CDN, city) pairs, as described above. If successful, the control module instructs clients in each city to use a different CDN. As another example, the content distribution monitor can be configured to monitor audience quality for triplets (CDN, city, ISP), and based on the data infer whether a quality issue is due to a client's CDN, ISP, or both.

The communication between the control module and the clients can be implemented in a variety of ways. In one example, the control module updates a centrally maintained configuration file that is periodically read by each client. In another example, the control module opens a connection to any clients implicated in the problem and sends commands directly to those clients. In various embodiments, instead of specifically instructing the client to make a change, a list of alternatives or suggestions is instead provided to the client, and the client is configured to perform some local decision making. As one example, suppose a client is experiencing difficulties obtaining advertisements from advertisement server 150. If multiple other advertising servers exist, rather than content distribution monitor 102 determining which advertisement server the client should switch to using, content distribution monitor 102 sends a list of three such serves, and the client is tasked with selecting from the list.

If the problem is determined to be CDN A, and CDN A is the only CDN able to provide the content, in some embodiments the control module instructs those clients affected by CDN A's problem to reduce the rate at which they stream. In addition, new clients joining CDN A can be instructed to use a lower rate than they might otherwise use.

If the problem is determined to be CDN A, and multiple CDNs are able to provide the content, in some embodiments the control module instructs those clients affected by CDN A's problem to switch to another CDN. In addition, new clients joining CDN A can be instructed to avoid CDN A.

If the problem is determined to be an ASN, in some embodiments the control module instructs the clients connected to that ASN to reduce the rate at which they are streaming. In addition, newly clients joining from the ASN can be instructed to use the lower rate.

If the problem is determined to be the client (e.g., the client's connection is congested or the CPU is overloaded), in some embodiments the control module instructs the client to reduce the rate at which it streams.

If the problem is determined to be an ad server, in some embodiments the control module instructs all clients to cease fetching or attempting to fetch advertisements from the ad server, and instead to fetch them from a different ad server.

In various embodiments, clients include logic to interpret the control module instructions and information. A client makes the ultimate decision based on the instructions and information received from control module information and/or its own internal state. The state can include both real-time state as well as historical state. Examples of states include, but are not limited to CPU utilizations, rendering rate, and whether the viewer watches full screen or not.

Selecting a CDN Based on External Input

Suppose a content owner distributes its content via multiple CDNs (CDN A and CDN B). Suppose also that the content owner's desire is to use CDN A for clients in the United States and CDN B for clients in Europe. When a client connects to the content owner's website to view a stream, an entity on the server side determines the location of the client and returns the CDN that the client should used based on its location. This technique can also be used with respect to more sophisticated policies, such as ones based on content being watched, or user class (e.g., premium versus regular).

Selecting a CDN Based on External Input of Multiple CDNs

Figure 8:
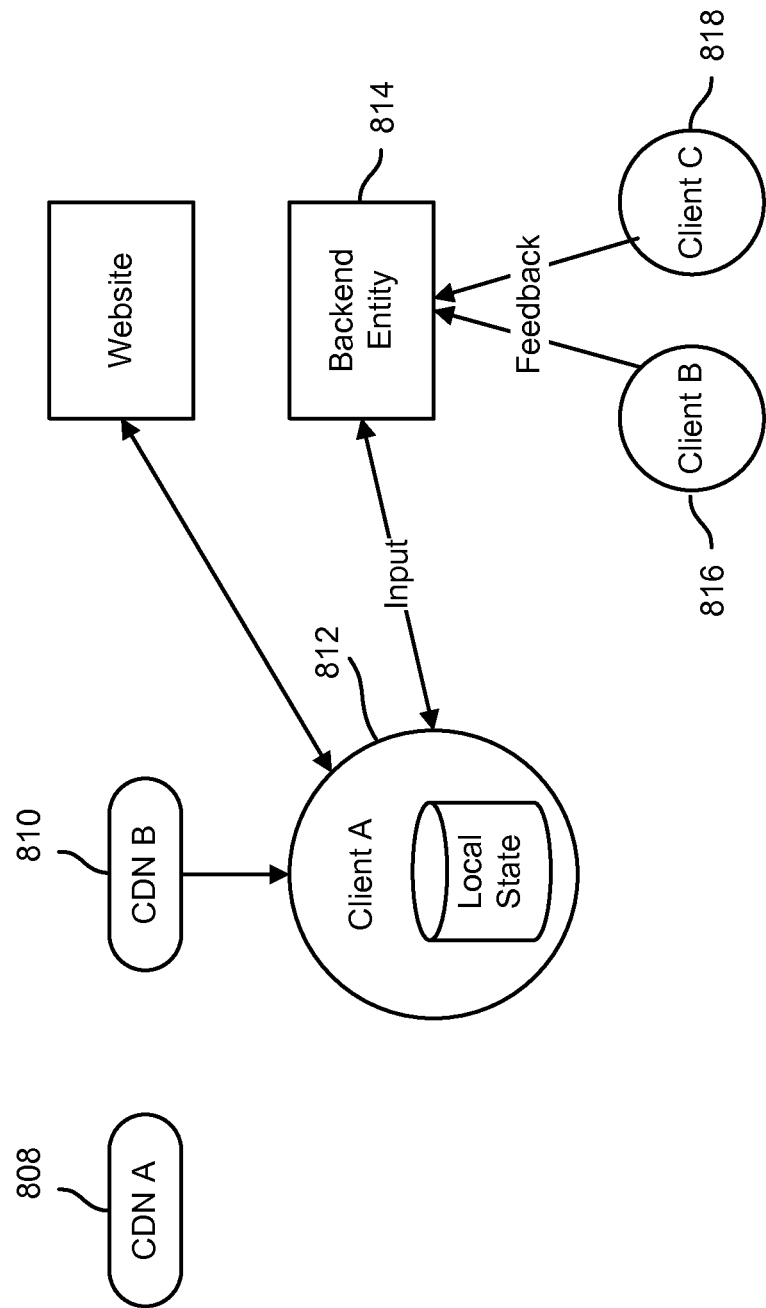
FIG. 8 illustrates an example of an environment in which content is distributed.

FIG. 8 illustrates an example of an environment in which content is distributed. In the example shown, a content owner distributes its content via multiple CDNs—CDN A (808) and CDN B (810). Suppose the content owner's policy is to use the CDN that provides the best quality for a client at the current time. When client A (812) connects to the content owner's website to view a stream, an entity at the backend determines the CDN that is expected to provide the best quality to client A. The backend entity (814) determines this using performance information from other clients such as clients B (816) and C (818). The backend entity sends the list of CDNs to client A in the preferred order based on the expected performance for client A. Client A then chooses the CDN based on this ordered list and local state. In some embodiments the local state keeps a black list of CDNs specific to client A based on attempts made by client A to each CDN. One reason for doing this is for when a CDN is expected to perform well for a client based on information known to the backend entity, but does not perform well in the particular case for a client. Once client A chooses a CDN, it connects and streams from that CDN.

Selecting Bit Rate Based on External Input and Local State

Suppose a content owner distributes its content using multiple bitrates (e.g., 300 kbps, 700 kbps, 1500 kbps, and 2700 kbps). Suppose also that the content owner wants to make all bitrates available to its premium customers in country A, but only make the 300 kbps and 700 kbps bitrates available to its regular customers in country A. In country B, the content owner wants to implement similar rules, but not provide the 2700 kbps bitrate to any customer. For security reasons, the knowledge of whether a customer is premium or not is maintained at the content owner's servers rather than at the client. One example of a premium customer is one who pays more for a higher class of service. When a client connects to the content owner's servers to stream the video, an entity on the server side determines the set of bitrates available to the client based on its location and service class and returns this set. The client then selects one of the available bitrates based on local state on the highest bitrate it can play without experiencing quality problems. This state can be maintained at the client based on previous viewings of content on this site or different sites.

Placing an Advertisement on a Page Based on External Input

Suppose a content owner wants to experiment with whether placing an advertisement on the left side of the page or the right side of the page has a better chance of the user clicking on the advertisement. When a client connects to the content owner's website, an entity on the server side determines which side the client should place its ad. The client places its ad in the specified location and reports back if the ad was ever clicked.

Treating Inputs from an External Entity as Commands

Suppose a content owner distributes content via multiple content distribution networks (CDN A and CDN B). Suppose also that the content owner wants to tightly control the traffic usage of the two CDNs and wants to change the usage between the CDNs based on quality and pricing in a continuous manner. In an extreme scenario the content owner may wish to turn off a CDN completely and migrate all users to the other CDN within a short period of time (e.g. a few minutes). To achieve this, the client periodically (e.g., every minute) sends a request to the content owner's website. An entity on the sever side determines for each client the CDN it should be connected to based on current policy settings. On the response to the first request from a client, the client will connect to the CDN provided. On subsequent responses, if the client is connected to a different CDN than the one returned, then it will immediately switch to the one returned. Here the client treats the response as a command to make sure the policies in the back end are enforced.

Treating Inputs from an External Entity as Hints

Suppose a content owner distributes content using multiple content distribution networks (CDN A and CDN B) and multiple bitrates (300 kbps, 700 kbps, and 1500 kbps). Suppose also that the player used by the content owner automatically adjusts the bitrate to the highest bit rate that the client can stream from the current CDN but does not switch between CDNs if streaming is working well. With this setup, it is possible that the client will get into the scenario where it plays the 700 kbps bitrate well on CDN A but cannot play the 1500 kbps on CDN A. Now suppose that the client could play at 1500 kbps at CDN B, but the client does not know this. In various embodiments, a "hint" from an external entity that has knowledge of this possibility (e.g., through inference based on other clients) can be sent to this client letting the client know that it may be able to play a higher bit rate on CDN B. The client may choose to ignore or take this hint based on local state such as user settings.

Decision on CDN is Updated Periodically

Suppose a content owner distributes its content via multiple CDNs (CDN A and CDN B). Suppose also that the content owner's policy is to use the CDN that provides the best quality for a client at the current time. When client A connects to the content owner's website to view a stream, an entity at the backend determines the CDN that is expected to provide the best quality to client A. The backend entity determines this using performance information from other clients (in this example clients B and C). The backend entity sends the list of CDNs to client A in the preferred order based on the expected performance for client A. Client A then chooses a CDN based on this ordered list and local state. Once client A chooses a CDN, it connects to and streams from that CDN. Network and CDN performance change over time and the CDN selection decision is updated periodically accordingly. Client A periodically (e.g., once every one minute) requests a new list of CDNs from the backend entity. If the backend entity determines that the CDN currently being used by client A is no longer best suited for client A, it will return a list with a different CDN as the most preferred CDN. When client A receives this new list, it makes a decision using the new list and local state on whether to stay on the current CDN or switch to the new one. If it decides to switch, it will immediately switch to the new most preferred CDN.

Client Decision when Communication with Backend Entity is Lost

Suppose a content owner distributes its content via multiple CDNs (CDN A and CDN B). Suppose also that the content owner's policy is to use the CDN that provides the best quality for a client at the current time. When client A connects to the content owner's website to view a stream, an entity at the backend determines the CDN that is expected to provide the best quality to client A. The backend entity determines this using performance information from other clients (in this example clients B and C). The backend entity sends the list of CDNs to client A in the preferred order based on the expected performance for client A. Client A then chooses the CDN based on this ordered list and local state. Once client A chooses a CDN, it connects to and streams from that CDN. During normal operation, if client A detects a quality problem with the CDN it is streaming from, it notifies the backend entity to get a different CDN. However, in the event it loses connectivity with the backend entity, the client uses the next CDN in the most recent list provided by the backend entity to select the next CDN to try.

The control module can use the information collected from the clients to determine the correlation between the viewer engagement and quality. Alternatively, an operator can use the historical or real-time information to determine this correlation.

Quantitative Relationship Between Video Quality and Viewer Engagement

Viewer sessions can be classified based on a set of (N) content attributes such as: (a) content format; (b) content type; (c) content genre; (d) content length; and (e) content publish time.

Engagement difference can be computed for viewer sessions viewing "similar" content. One definition of content "similarity" is equality of a majority of content attributes where (a) all (N) attributes are equal; (b) only (N−1) attributes may be equal; (c) only (N−2) attributes may be equal; etc.

By computing and comparing engagement differences for content with similar attributes (where a majority of attributes are similar), the impact of content itself on engagement can be reduced, thus highlighting the impact of video quality on viewer experience.

Example 1

Consider a live sporting event of duration D (e.g., D=2 hours). Let the number of viewers joining to watch the event in the first minute be N=10,000. Let the average video quality and corresponding viewer engagement of various viewers be as follows:

TABLE 1

| Category | Viewers | Number of Viewers | Video Quality | Viewer Engagement (Viewing Duration) |
|---|---|---|---|---|
| C1 | V1 ... V3000 | N1 = 3000 | Join Time = 1 sec, Buffering Ratio = 0, Rendering Quality = 100% | D1 = 1 hr 10 mins |

TABLE 1-continued

| Category | Viewers | Number of Viewers | Video Quality | Viewer Engagement (Viewing Duration) |
|---|---|---|---|---|
| C2 | V3001 ... V7000 | N2 = 4000 | Join Time = 4 secs, Buffering Ratio = 3%, Rendering Quality = 95% | D2 = 1 hr |
| C3 | V7001 ... V10000 | N3 = 3000 | Join Time = 4 secs, Buffering Ratio = 6%, Rendering Quality = 90% | D3 = 40 mins |

As shown in TABLE 1, viewers have been classified by video quality into three categories. Viewers with poorer video quality watched the video for fewer minutes. The net loss of viewer engagement for viewers with poor video quality can be computed as: [N2× [D1−D2]]+[N3× [D3−D1]]=4000×10+3000×30=13,000 minutes.

Example 2

Consider a website where the viewer can view multiple videos on demand. After viewing a video, the viewer is presented the same interface to optionally continue watching more videos. Let there be a set of K videos with similar attributes (genre="action", format="episode", duration="30 mins"). Let the number of viewers who have watched at least one of these videos in a given month be N=10,000. Let the average number of videos watched by viewers with varying video quality be as follows:

TABLE 2

| Category | Viewers | Number of Viewers | Video Quality | Viewer Engagement (Average Number of Videos Watched in a Month) |
|---|---|---|---|---|
| C1 | V1 ... V3000 | N1 = 3000 | Join Time = 1 sec, Buffering Ratio = 0, Rendering Quality = 100% | D1 = 3.5 |
| C2 | V3001 ... V7000 | N2 = 4000 | Join Time = 4 secs, Buffering Ratio = 3%, Rendering Quality = 95% | D2 = 3 |
| C3 | V7001 ... V10000 | N3 = 3000 | Join Time = 4 secs, Buffering Ratio = 6%, Rendering Quality = 90% | D3 = 2 |

As shown in TABLE 2, viewers have been classified by video quality into three categories. Viewers with poorer video quality watched a fewer number of videos. The net loss of viewer engagement for viewers with poor video quality can be computed as [N2×[D1−D2]]+[N3× [D3−D1]]× (duration of episode)=(4000×0.5+3000×1.5)×30=195,000 minutes.

Visualization Tools and Manual Diagnosis of Problems

In addition to automatically detecting content distribution problems, content distribution monitor 102 is configured to make available visualization tools to human operators. Using the tools, such operators can quickly identify problems. The interface creates visualizations for them based on quality metrics such as the percentage of viewers in a buffering state, the amount of time needed to start playing a video stream as perceived by the viewers, etc. Other users, such as business and marketing executives can also use the tools to examine data trends in general, and without needing a specific purpose of problem detection. The interface creates visualizations for them based on metrics that are correlated with revenue and brand. Examples include the concurrent number of viewers, the percentage of viewers dropping because of quality problems, the number of advertising clicks, etc. Interactive controls are provided to allow both operators and other users to view virtually any slice of the multidimensional data captured by content distribution monitor 102.

FIGS. 9-13 illustrate embodiments of an interface through which content distribution monitoring data is exposed. In various embodiments, the interfaces are provided by content distribution monitor 102, such as through gateway layer 526.

Figure 9:
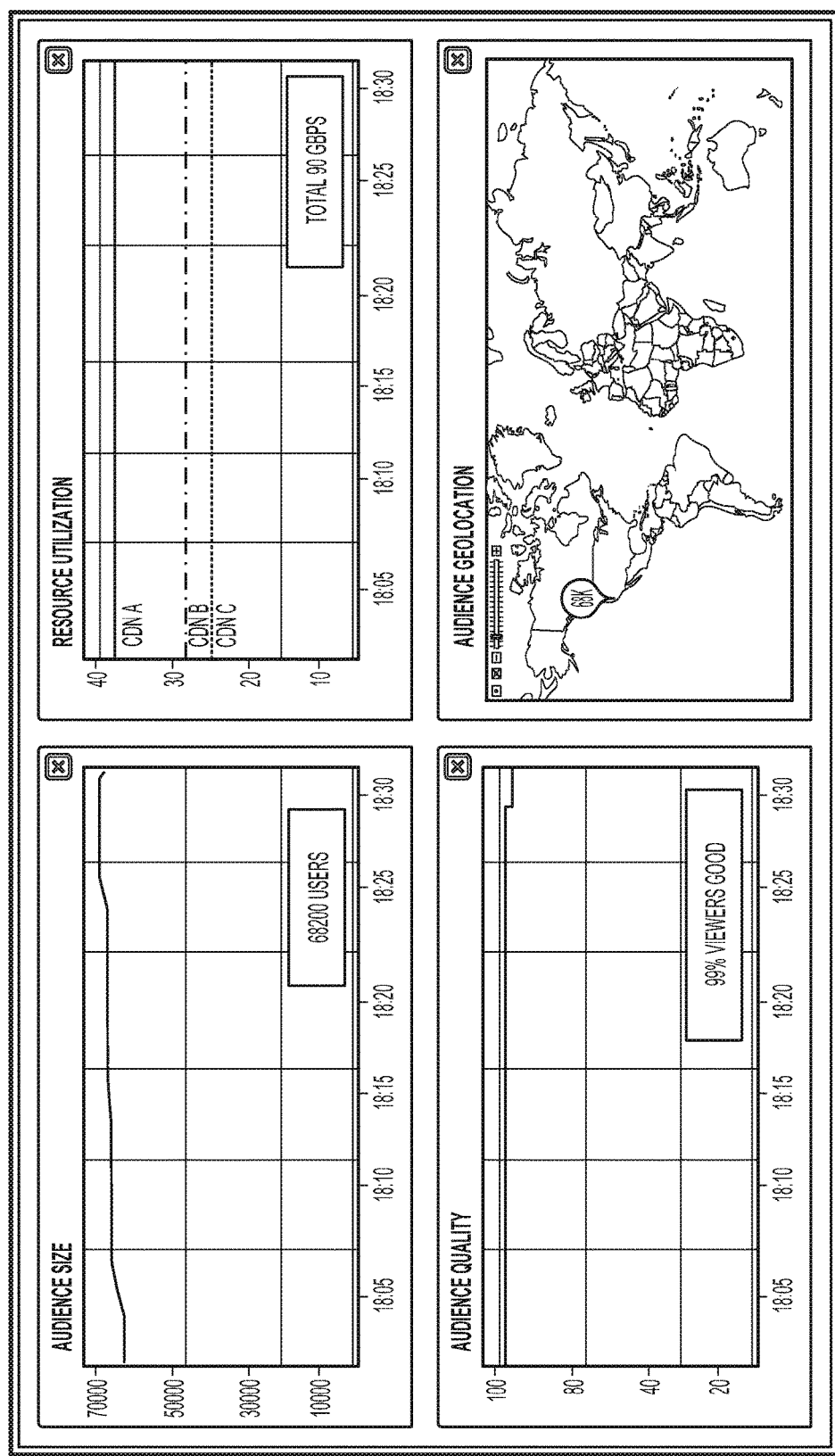
FIG. 9 illustrates an embodiment of an interface through which content distribution monitoring data is exposed.

The interface shown in FIG. 9 includes four plots. The "Audience Size" plot (upper-left) shows the total number viewers versus time. The "Resource Utilization" plot (upper-right) shows the total bandwidth delivered by each CDN. The "Audience Quality" plot (bottom-left) shows the aggregate quality experienced by all viewers. The "Audience Geolocation" plot (bottom-right) shows the location of the viewers on a world map. Each plot shows data in realtime, and changes are reflected through frequent refreshes of the interface.

Figure 10:
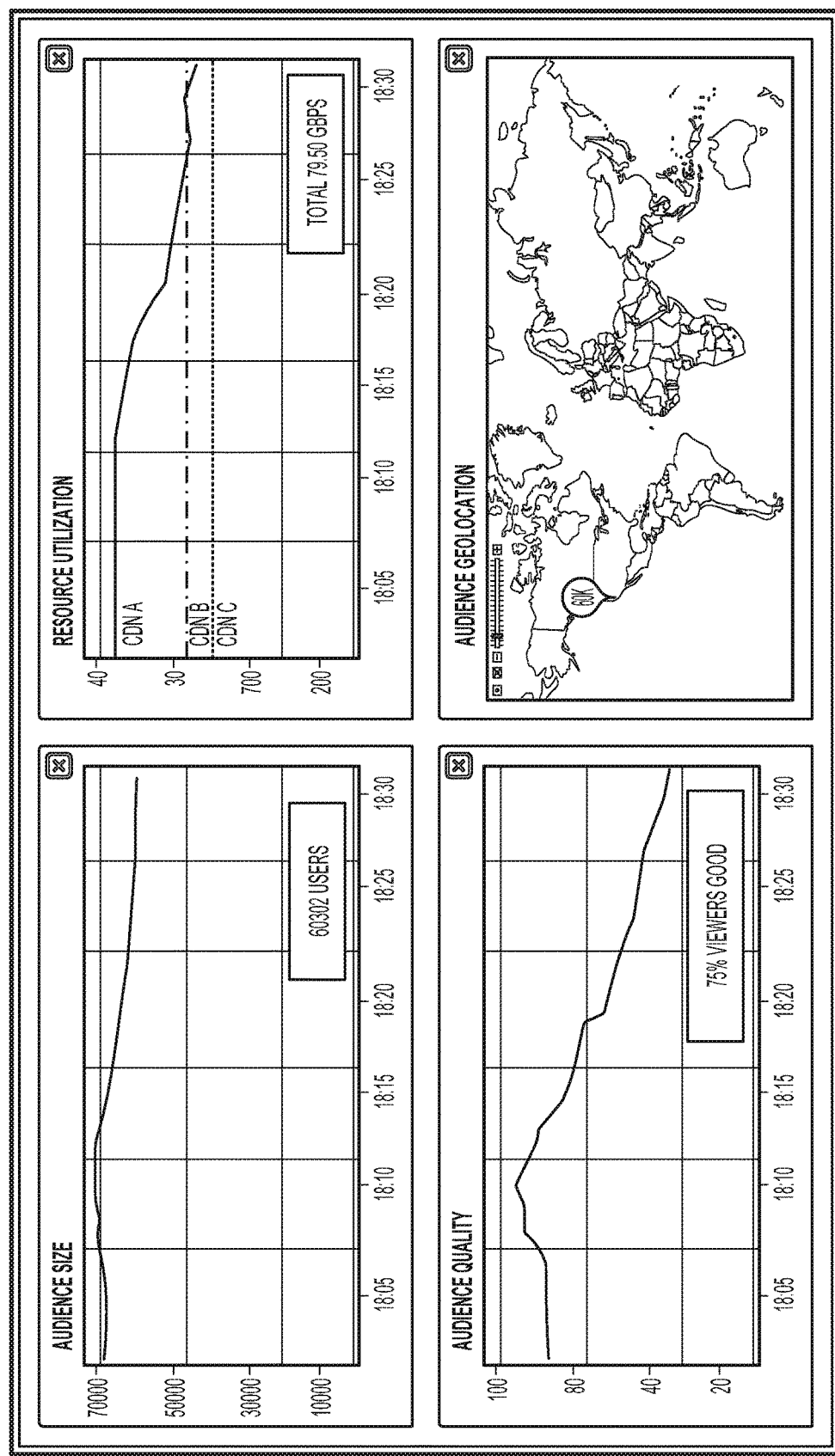
FIG. 10 illustrates an embodiment of an interface through which content distribution monitoring data is exposed.

Suppose an operator sees audience quality dropping, as shown in FIG. 10. This drop in quality correlates with a drop in the total number of viewers, and a drop of the bandwidth delivered by CDN A. Based on this data, the operator hypothesizes that CDN A is likely part of the problem.

Figure 11:
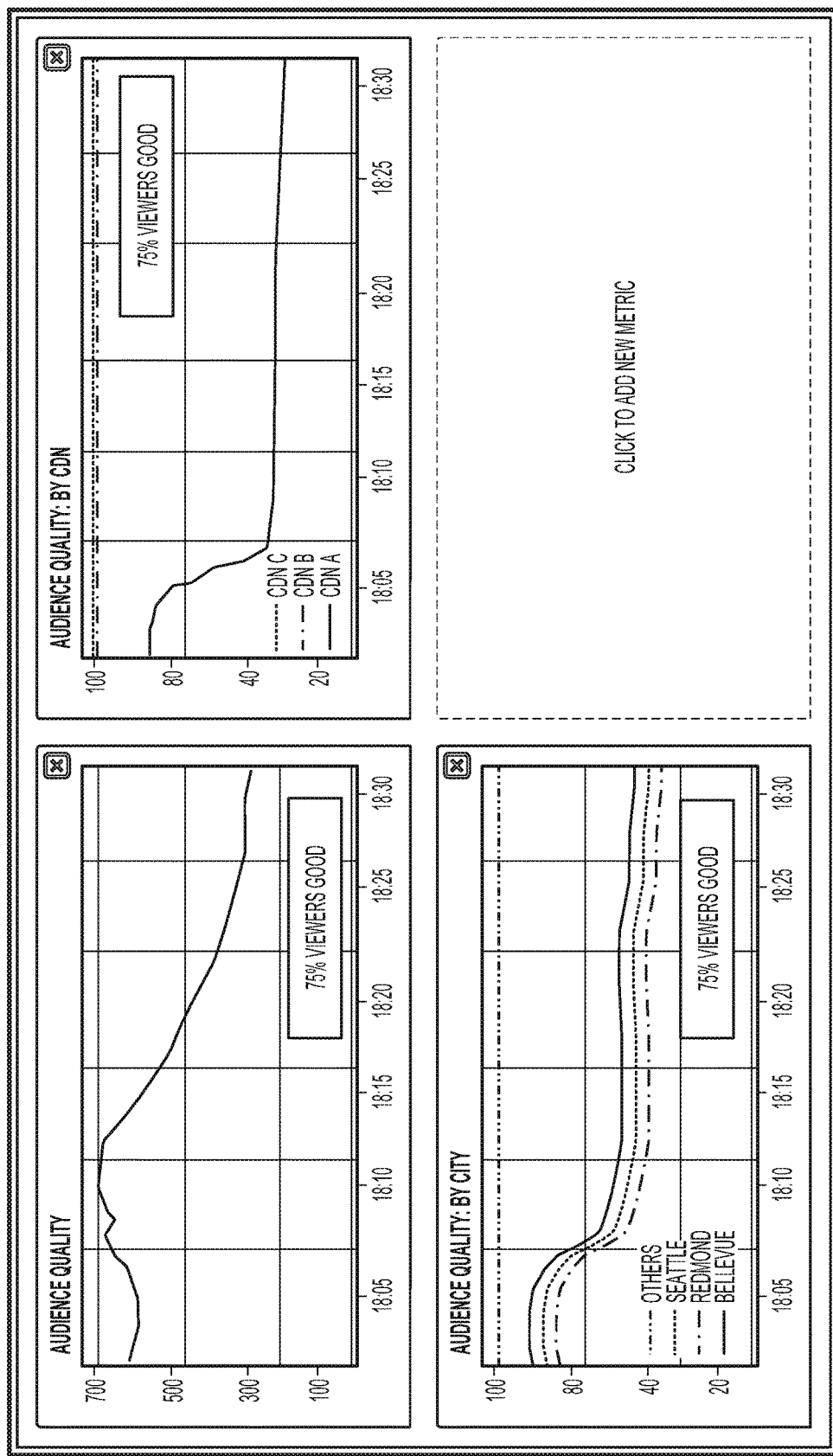
FIG. 11 illustrates an embodiment of an interface through which content distribution monitoring data is exposed.

The operator can verify this hypothesis by creating two new plots, as shown in FIG. 11. The upper-right plot shows the audience quality ranked by CDNs, while the bottom-left plot shows the audience quality ranked by city. Since, in both of these plots, CDN A and cities in the Seattle region are the only ones to perform poorly, the operator further hypothesizes that the problem is localized to the viewers in the Seattle region streaming from CDN A.

Figure 12:
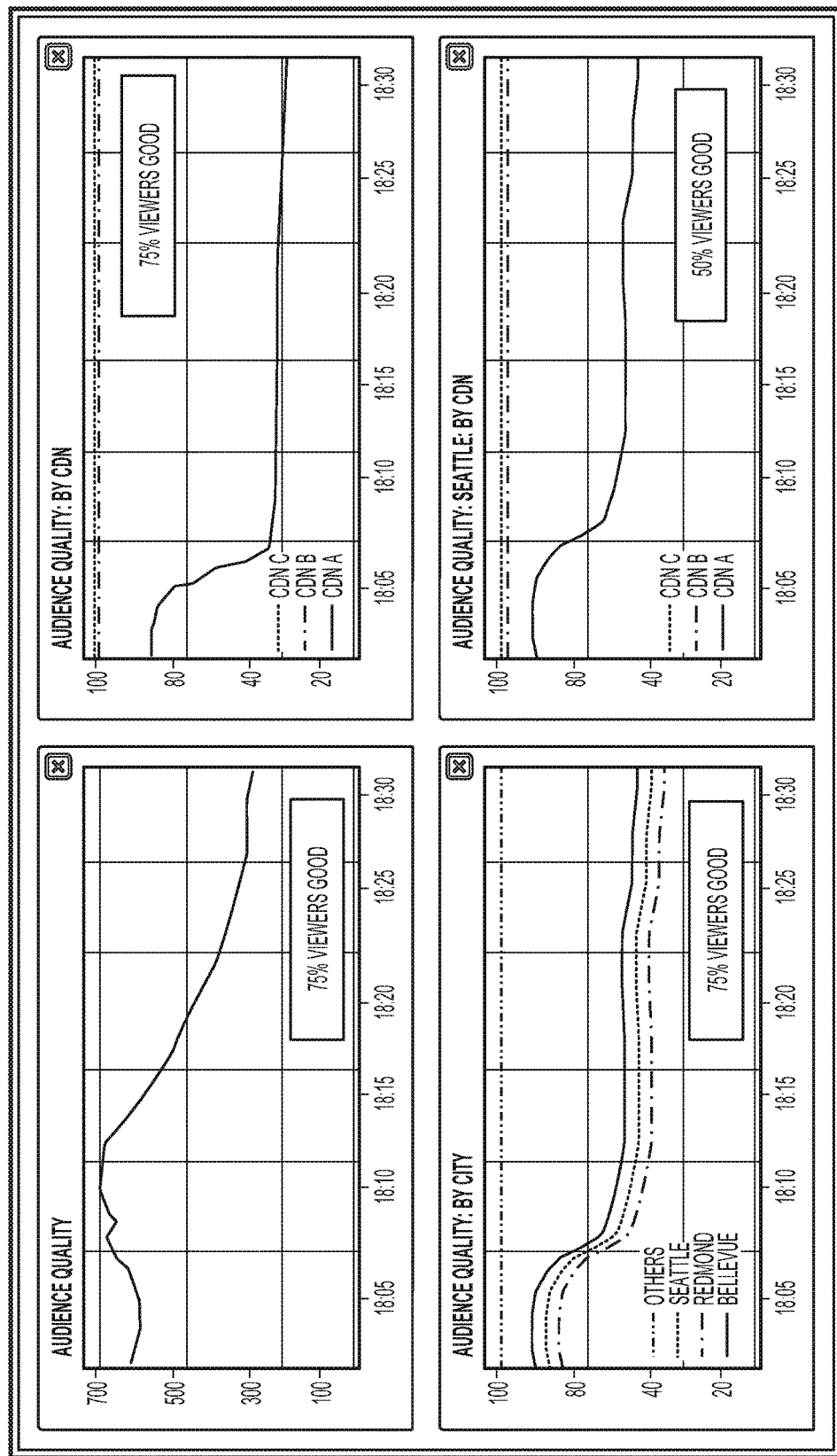
FIG. 12 illustrates an embodiment of an interface through which content distribution monitoring data is exposed.

To verify this new hypothesis, the operator adds a new plot showing the quality of viewers in Seattle ranked by CDN, as shown in the bottom-right plot in FIG. 12. This plot show that, indeed, only the Seattle viewers who stream from CDN A see quality issues; viewers from Seattle streaming from other CDNs see no quality degradation. As a result, the operator concludes that the hypothesis was correct, i.e., that the problem is localized to the viewers in the Seattle region streaming from CDN A.

The operator can take actions to improve the viewer quality in the Seattle region. Examples of such actions include calling CDN A to fix the problem, or/and pushing new configuration files to the players. Such configuration file can, e.g., specify that if the player is in the Seattle region, it should use a CDN other than CDN A.

In addition to diagnosing widespread problems, operators can also use the visualization tools provided by content distribution monitor 102 to diagnose quality issues experienced by particular clients.

Suppose a user who reports quality issues to a customer service organization in charge with overseeing the delivery of the content. The user provides the service operator with the IP address or other unique identifier (e.g., HTTP cookie, user login) to help the operator identify the user's end-host.

Figure 13:
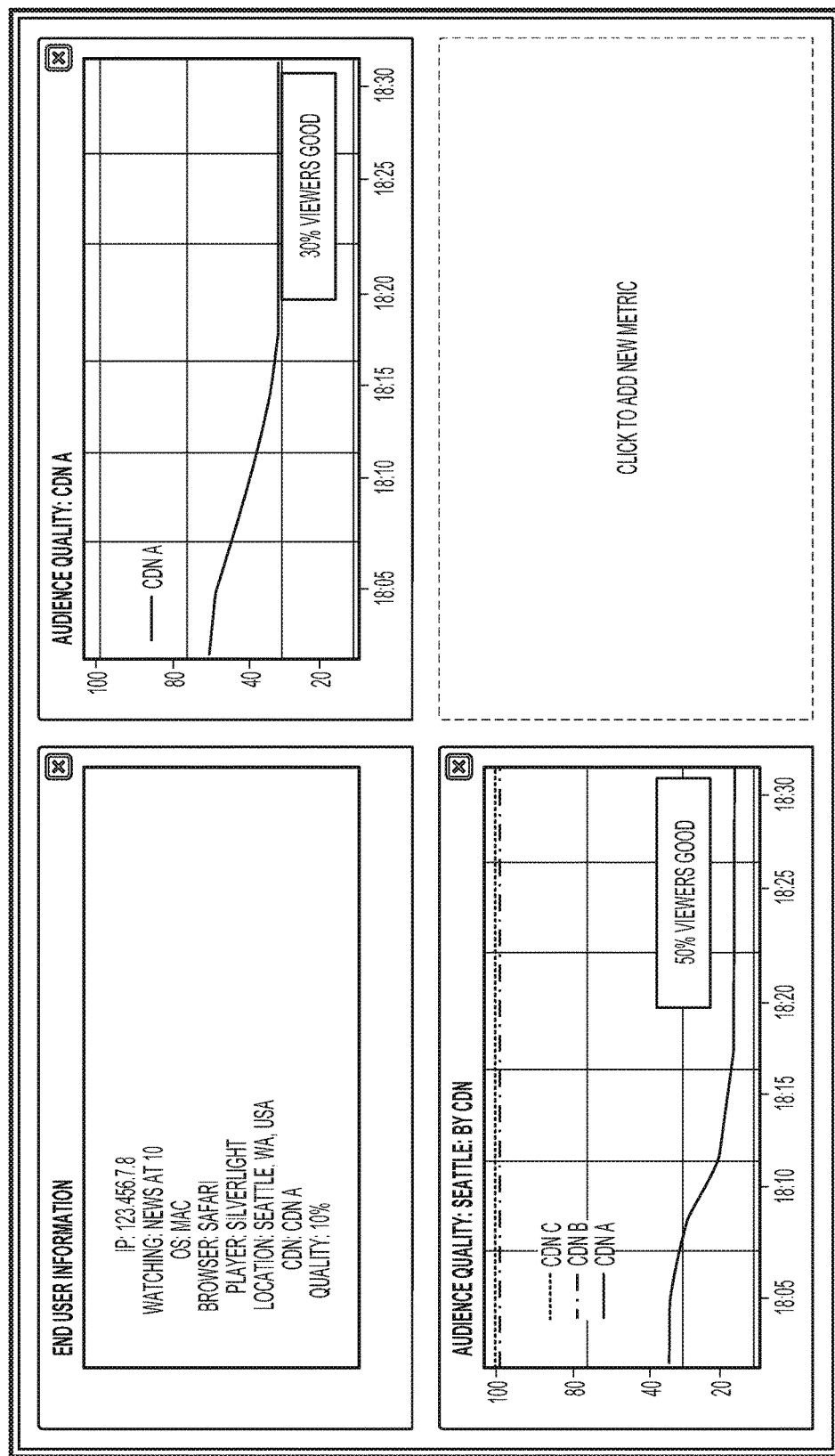
FIG. 13 illustrates an embodiment of an interface through which content distribution monitoring data is exposed.

The operator uses this identifier to see in real-time a summary of the information associated with the user's client. FIG. 13 shows an example in which the quality of the client with the IP address 123.456.7.8 is only 10% (upper-left plot). In addition, the interface indicates that the client is located in Seattle and streams data from CDN A.

To determine the root cause the problem the operator uses the interface to show (a) the audience quality of viewers using CDN A (upper-right plot), and (b) the audience quality of all viewers in Seattle ranked by CDN (bottom-left plot).

Based on the second plot that shows that only the viewers in Seattle which stream from CDN A experience quality issues, the operator concludes that likely the problem experienced by the client is due to CDN A. To fix this problem, the operator configures the client remotely (e.g., via a configuration file) to use another CDN.

Additional Embodiments

Multivariate Testing

The techniques described herein can be used for a variety of purposes in addition to detecting and remedying content distribution problems. As one example, content owners (or other appropriate parties) can perform multivariate testing and, based on the results, make adjustment to content distribution settings.

Figure 14A:
FIG. 14A is a graph illustrating the impact of distribution quality on a content item.
Figure 14B:
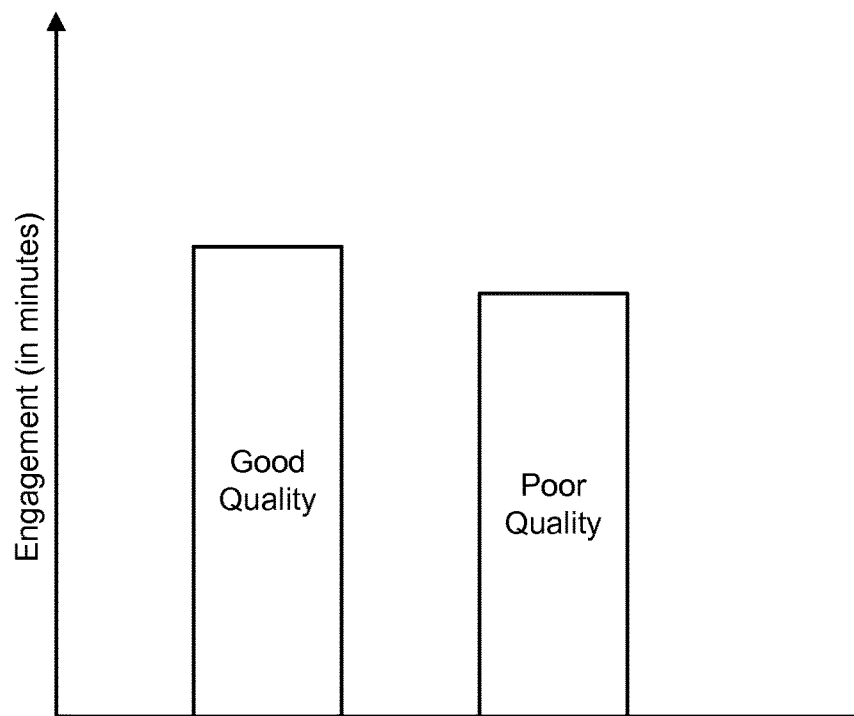
FIG. 14B is a graph illustrating the impact of distribution quality on a content item.

FIGS. 14A and 14B are graphs illustrating the impact of distribution quality on a content item. Specifically, FIG. 14A indicates that, for a first content item (e.g., a feature length film), clients which experience a good experience tend to watch the item approximately twice as long as those with a poor experience. FIG. 14B indicates that, for a second content item (e.g., a breaking news report), the length of time a particular client streams the content is largely unimpacted by the quality of the experience.

Figure 15:
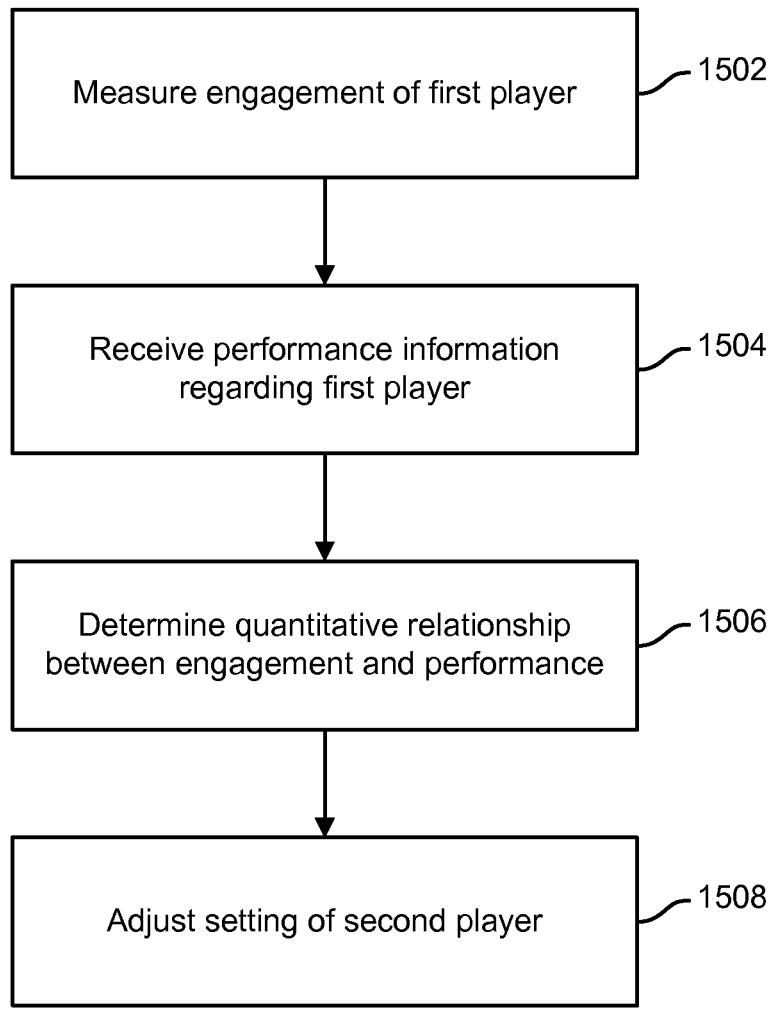
FIG. 15 illustrates an example of a process for improving a content player engagement.

FIG. 15 illustrates an example of a process for improving a content player engagement. The process begins at 1402 when an engagement of a first content player with respect to a first content item being downloaded by the first client is measured. As one example, the amount of time a particular client, such as client 176, views a particular feature length film is determined. At 1404, heartbeat information is received from the client. In some embodiments the processing of 1402 and 1404 is combined, as applicable. At 1406, a determination is made as to the quantitative relationship between the engagement and the performance information. In various embodiments, the processing of 1402 and 1404 is also performed with respect to other clients that are also accessing the same content, and the resulting information is used at 1406. At 1408, a setting of a second player with respect to the same content is adjusted. As one example, if a determination is made that the content can be provided, at reduced quality, without incurring a significant reduction in engagement, the content owner may instruct content distribution monitor 102 to send instructions to other clients receiving the content to obtain the content at a lower bitrate. Similarly, if a determination is made that changes in quality significantly change engagement, instructions to devote more bandwidth to clients experiencing poor performance might be provided to content distribution monitor 102.

Enforcing Policies

In various embodiments, content owners and other appropriate parties are granted access to a policy engine that allows them to configure and revise a list of policies. Policies provided by the customer are based on the following pattern:
 1. matching rule A: action A
 2. matching rule B: action B
 3. matching rule C: action C The matching rule determines the subset of the viewers on which the policy is to be applied. In addition, multiple matching rules can be provided for certain policies according to a specified priority order. When the policy engine needs to decide an action for a viewer, it iterates through the ordered list and based on the first match selects the appropriate action.

The matching rules are composed of predicates on several dimensions that identify the viewers. Example dimensions include:
 1. Location of the viewer (e.g., Country, State, City, Zip code).
 2. The ISP and AS through which the viewer is connecting to the Internet.
 3. Technographics of the viewer (e.g., browser, OS, network speed)
 4. Content being watched by the viewer (e.g., name of video, play list name, etc.)

Example actions include:
 1. Maintain uninterrupted viewing by switching between an ordered list of resources (e.g., Data centers, CDNS) via which the viewer downloads the video. This provides high availability of the connection of the viewer to the content.
 2. Maintain high quality viewing by switching in accordance with an ordered list of resources via which the viewer downloads the video. This provides a glitch free viewing experience (e.g., minimizes the impact of overloaded delivery servers, or network path congestion).
 3. Optimize video resolution by switching the bitrate of the video. This allows the download bandwidth of the viewer to provide the highest resolution possible.
 4. Optimize video viewing quality given limited bandwidth available to the user by using a lower bitrate video. This provides consistent delivery of content even if the bandwidth available to the user is low.
 5. Minimize cost of delivery by switching the viewer to lower delivery cost resource if the quality of download offered by the lower cost resource is consistent.
 6. Maintain load balance between a list of available resources. The load balancing is done based on priority weights associated with each resource in the list.
 7. Enforce a usage limit on a resource by forcing viewers to switch away after a bandwidth or downloaded byte threshold is met.

As mentioned above, in various embodiments, content distribution monitor 102 includes a control module or works in conjunction with a separate control system. The control system is configured to enforce policies specified via the policy engine. As one example, in some embodiments whenever an initial client request is made for content, the control system determines an appropriate content source for the client based on the policies and also based on telemetry information made available via content distribution monitor 102.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:
1. A system, including:
 one or more processors configured to:
  measure an engagement of a first content player with respect to a content item being downloaded by a first remote client;

obtain performance information associated with the first content player;

based at least in part on the measured engagement of the first content player with the content item and the performance information associated with the first content player, determine, for the content item, a quantitative relationship between content quality and content player engagement; and based at least in part on the quantitative relationship determined, for the content item, between content quality and content player engagement, adjust, for a second remote client receiving the same content item, a setting associated with at least one of a download and a playing of the same content item by the second remote client; and a memory coupled to the one or more processors and configured to provide the one or more processors with instructions.

2. The system of claim 1 wherein the measured engagement comprises a length of time that the first content player has been playing the content item.

3. The system of claim 1 wherein the measured engagement comprises a length of time that the first content player has been playing a plurality of content items.

4. The system of claim 1 wherein the measured engagement comprises a length of time that the first remote client has been connected to a content distribution network.

5. The system of claim 1 wherein the measured engagement comprises an amount of data associated with a download of the content item.

6. The system of claim 1 wherein the measured engagement comprises a number of content items viewed.

7. The system of claim 1 wherein the measured engagement comprises a display mode of a video screen.

8. The system of claim 1 wherein the measured engagement comprises a viewer interaction with at least one player control.

9. The system of claim 1 wherein the measured engagement comprises a viewer interaction with an advertisement.

10. The system of claim 1 wherein the obtained performance information comprises information associated with a join failure.

11. The system of claim 1 wherein the obtained performance information comprises information associated with a join time.

12. The system of claim 1 wherein the obtained performance information comprises information associated with a number of buffering events.

13. The system of claim 1 wherein the obtained performance information comprises information associated with a duration of buffering events.

14. The system of claim 1 wherein the obtained performance information comprises information associated with a frequency of buffering events.

15. The system of claim 1 wherein the obtained performance information comprises information associated with a frequency of frames per second of video rendered.

16. The system of claim 1 wherein the obtained performance information comprises information associated with a rendering quality.

17. The system of claim 1 wherein the obtained performance information comprises information associated with a video bit rate.

18. The system of claim 1 wherein a bitrate is adjusted.

19. The system of claim 1 wherein a source of the content item is adjusted.

20. The system of claim 19 wherein the source is a content delivery network.

21. The system of claim 1 wherein a buffer size is adjusted.

22. The system of claim 1 wherein the one or more processors are further configured to adjust a setting associated with a download of the content item by the first remote client.

23. The system of claim 1 wherein the one or more processors are configured to adjust the setting associated with the at least one of the download and the playing of the content item by the second remote client at least in part by sending an instruction to the second remote client.

24. The system of claim 1 wherein the obtained performance information is a first information and wherein the one or more processors are configured to obtain additional performance information associated with a plurality of respective additional content players.

25. The system of claim 1 wherein the one or more processors are further configured to measure an engagement of a plurality of content players with respect to the same content item.

26. The system of claim 1 wherein the one or more processors are further configured to measure an engagement of a third content player with respect to another content item.

27. The system of claim 26 wherein the first and third content player are different.

28. A method, including:

measuring an engagement of a first content player with respect to a content item being downloaded by a first remote client;

obtaining performance information associated with the first content player;

based at least in part on the measured engagement of the first content player with the content item and the performance information associated with the first content player, determining, for the content item and using one or more processors, a quantitative relationship between content quality and content player engagement; and based at least in part on the quantitative relationship determined, for the content item, between content quality and content player engagement, adjust, for a second remote client receiving the same content item, a setting associated with at least one of a download and a playing of the same content item by the second remote client.

29. A computer program product embodied in a non-transitory computer readable storage medium and comprising computer instructions for:

measuring an engagement of a first content player with respect to a content item being downloaded by a first remote client;

obtaining performance information associated with the first content player;

based at least in part on the measured engagement of the first content player with the content item and the performance information associated with the first content player, determining, for the content item, a quantitative relationship between content quality and content player engagement; and based at least in part on the quantitative relationship determined, for the content item, between content quality and content player engagement, adjust, for a second remote client receiving the same content item, a setting associated with at least one of a download and a playing of the same content item by the second remote client.

* * * * *